United States Patent [19]

Deering

[11] Patent Number: 4,885,703
[45] Date of Patent: Dec. 5, 1989

[54] 3-D GRAPHICS DISPLAY SYSTEM USING TRIANGLE PROCESSOR PIPELINE

[75] Inventor: Michael F. Deering, Mountain View, Calif.

[73] Assignee: Schlumberger Systems, Inc., Sunnyvale, Calif.

[21] Appl. No.: 117,111

[22] Filed: Nov. 4, 1987

[51] Int. Cl.$^4$ .......................................... G06F 15/626
[52] U.S. Cl. ..................................... 364/522; 340/747; 340/732
[58] Field of Search ........................ 364/518, 521, 522; 358/104; 340/721, 732, 727, 747, 750, 729

[56] References Cited

U.S. PATENT DOCUMENTS

| | | |
|---|---|---|
| 3,684,876 | 8/1972 | Sutherland . |
| 3,732,557 | 5/1973 | Evans et al. . |
| 3,763,365 | 10/1973 | Seitz ..................................... 235/156 |
| 3,816,726 | 6/1974 | Sutherland et al. . |
| 3,889,107 | 6/1975 | Sutherland . |
| 4,283,765 | 8/1981 | Rieger . |
| 4,291,380 | 9/1981 | Rohner . |
| 4,343,037 | 8/1982 | Bolton ............................. 352/104 X |
| 4,371,872 | 2/1983 | Rossman . |
| 4,380,046 | 4/1983 | Fung . |
| 4,412,296 | 10/1983 | Taylor . |
| 4,458,330 | 7/1984 | Imsand et al. . |
| 4,492,956 | 1/1985 | Collmeyer et al. ................. 340/723 |
| 4,550,315 | 10/1985 | Bass et al. ......................... 340/729 X |
| 4,570,181 | 2/1986 | Yamamura . |
| 4,570,233 | 2/1986 | Yan et al. . |
| 4,586,038 | 4/1986 | Sims et al. . |
| 4,646,075 | 2/1987 | Andrews et al. .................... 340/747 |
| 4,658,247 | 4/1987 | Gharachorloo ................ 364/521 X |
| 4,697,178 | 9/1987 | Heckel . |
| 4,709,231 | 11/1987 | Sakaibara et al. .................... 340/729 |
| 4,730,261 | 3/1988 | Smith .................................. 364/521 |
| 4,736,200 | 4/1988 | Oununa . |
| 4,737,921 | 4/1988 | Goldwasser et al. ............ 340/747 X |

FOREIGN PATENT DOCUMENTS

| | | |
|---|---|---|
| 0137233A2 | 8/1984 | European Pat. Off. . |
| 0167165A2 | 7/1985 | European Pat. Off. . |
| 84/0153 | 7/1984 | PCT Int'l Appl. . |
| 84/01705 | 10/1984 | PCT Int'l Appl. . |

OTHER PUBLICATIONS

"High Speed Image Rasterization Using Scan Line Access Memories", Demetrescu, 1985 Chapel Hill Conference on Very Large Scale Integration 35 (H. Fuchs ed, 1985).

(List continued on next page.)

*Primary Examiner*—A. D. Pellinen
*Assistant Examiner*—A. Jonathan Wysocki
*Attorney, Agent, or Firm*—David H. Carroll; Robert C. Colwell; Paul C. Haughey

[57] ABSTRACT

A graphic processing system for representing three-dimensional objects on a monitor which uses a pipeline of polygon processors coupled in series. The three-dimensional objects are converted into a group of two-dimensional polygons. These polygons are then sorted to put them in scan line order, with each polygon having its position determined by the first scan line on which it appears. Before each scan line is processed, the descriptions of the polygons beginning on that scan line are sent into a pipeline of polygon processors. Each polygon processor accepts one of the polygon descriptions and stores it for comparison to the pixels of that scan line which are subsequently sent along the polygon processor pipeline. For each new scan line, polygons which are no longer covered are eliminated and new polygons are entered into the pipe. After each scan line is processed, the pixels can be sent directly to the CRT or can be stored in a frame buffer for later accessing. Two polygon processor pipelines can be arranged in parallel to process two halves of a display screen, with one pipeline being loaded while the other is processing. A frame buffer and frame buffer controller are provided for overflow conditions where two passes through the polygon pipeline are needed. A unique clipping algorithm forms a guardband space around a viewing space and clips only polygons intersecting both shells. Extra areas processed are simply not displayed.

14 Claims, 12 Drawing Sheets

OTHER PUBLICATIONS

"Super Buffer: A Systolic VLSI Graphics Engine for Real Time Raster Image Generation", Gharachorloo & Pottle, 1985 Chapel Hill Conference on Very Large Scale Integration 35 (H. Fuchs ed, 1985).

"Pixel-Planes: Building a VLSI-Based Graphics System", Foulton et al., 1985 Chapel Hill Conference on Very Large Scale Integration 35 (H. Fuchs ed, 1985).

"Reentrant Polygon Clipping", Sutherland & Hodgman, Communications of the ACM, Jan. 1974, vol. 17.

"An Analysis and Algorithm for Polygon Clipping", Liang & Barsky, Research Contributions, Robert Haralick, Editor, 1983 ACM.

"A VLSI Approach to Computer Image Generation", Cohen & Demetrescu, presented at the First Interservice/Industry Training Equipment Conference, Orlando, Fla., Nov. 28, 1979.

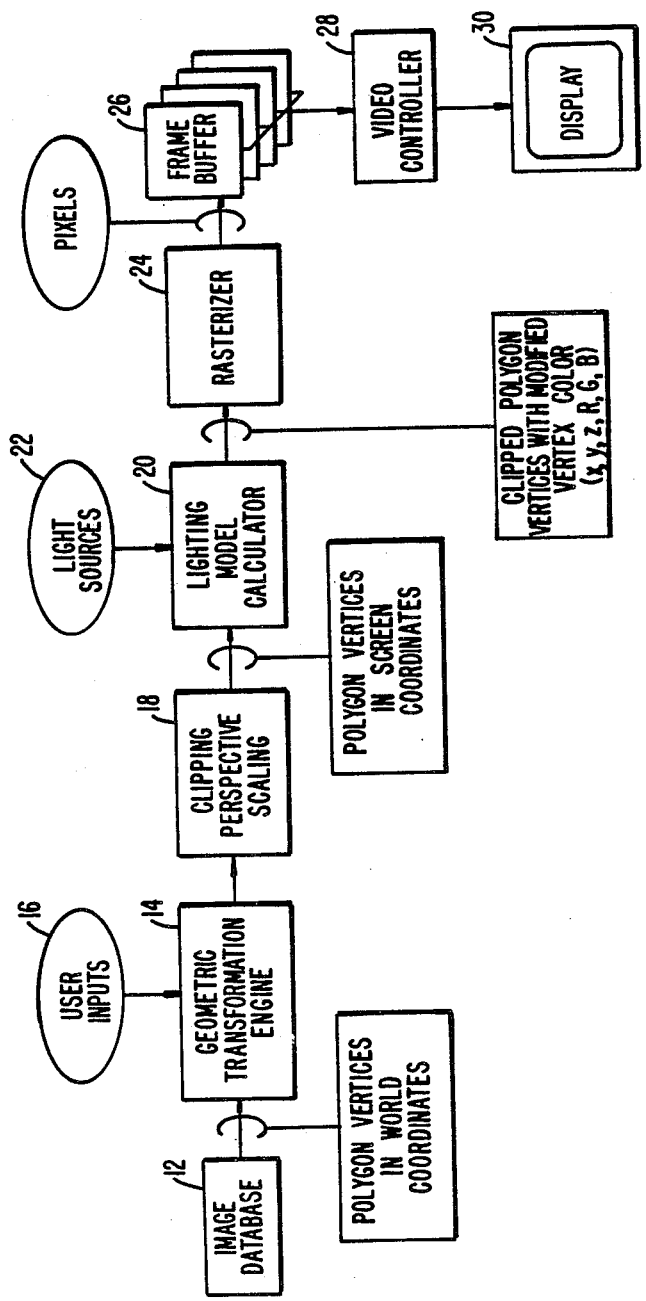
FIG.—1. PRIOR ART

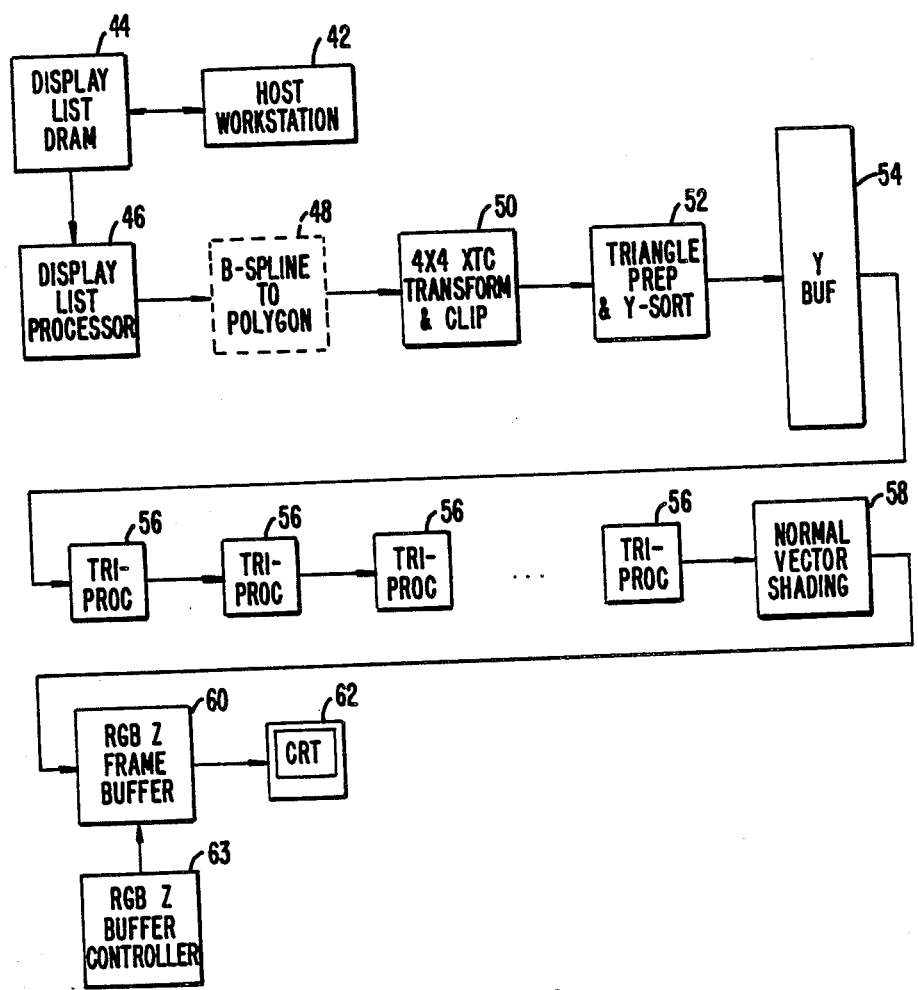
FIG._2.

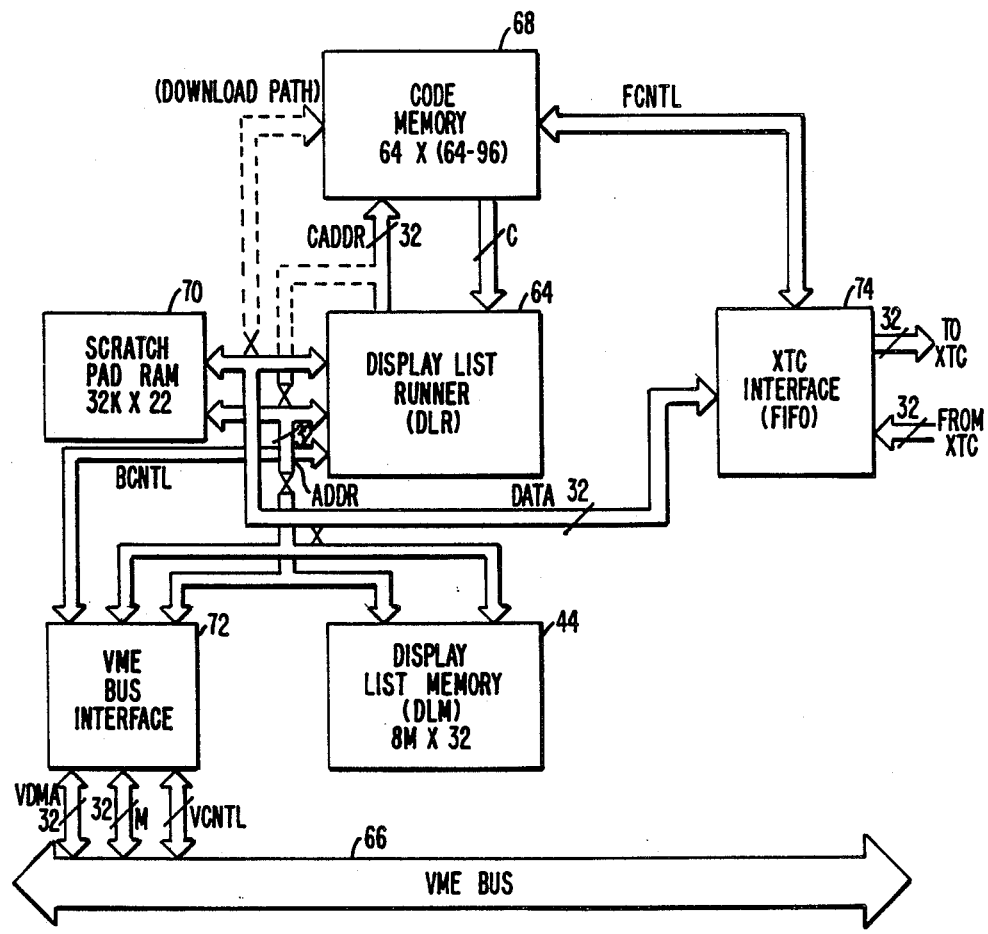
FIG._3.

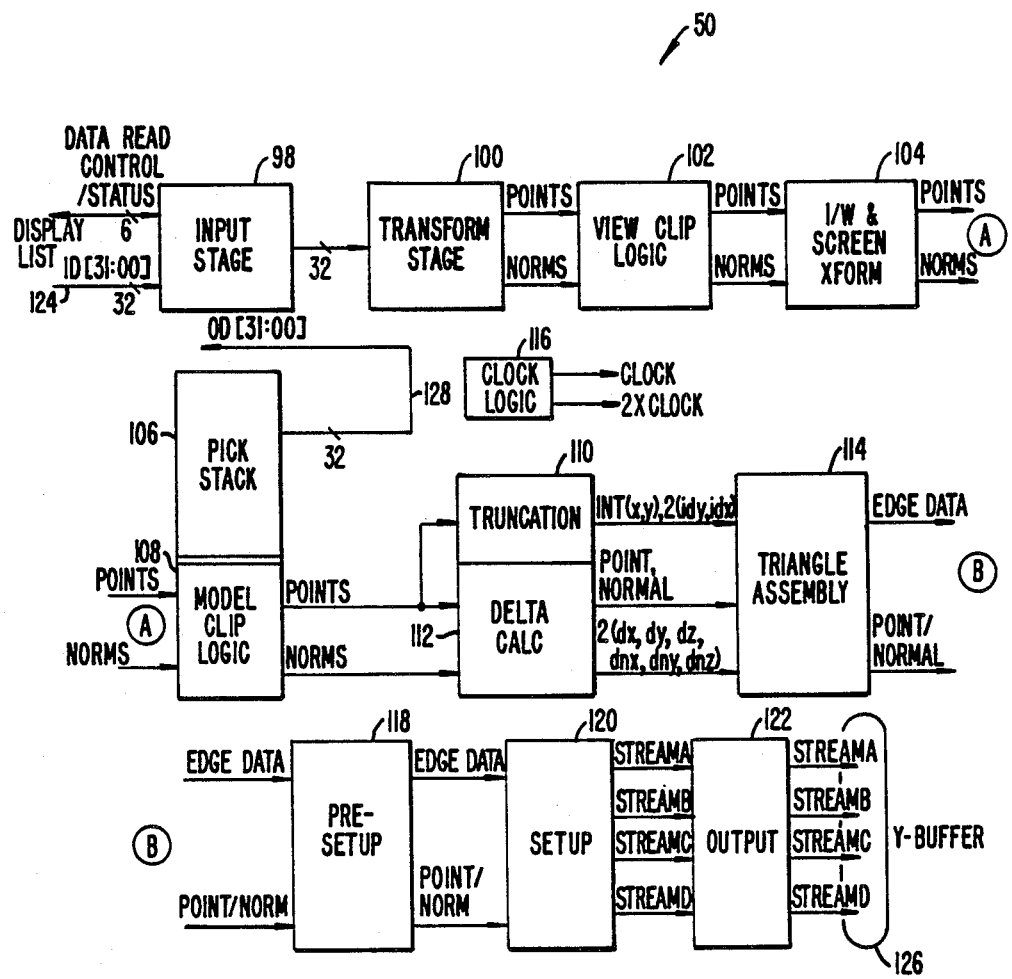
FIG._4.

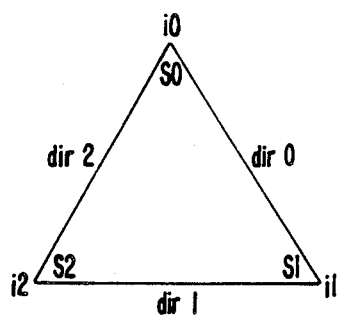
WIDE BOTTOM; WB
FIG._5A.
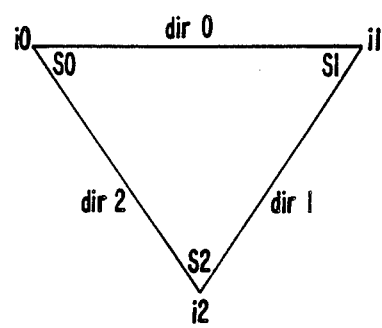
WIDE TOP; WT
FIG._5B.
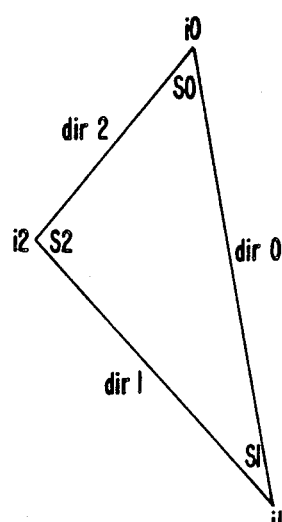
NEW LEFT; NL
FIG._5C.
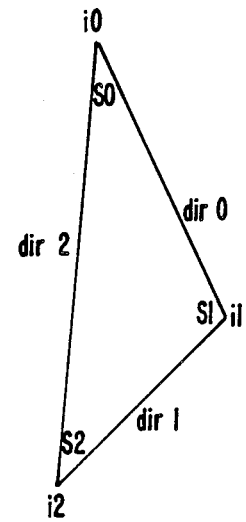
NEW RIGHT; NR
FIG._5D.

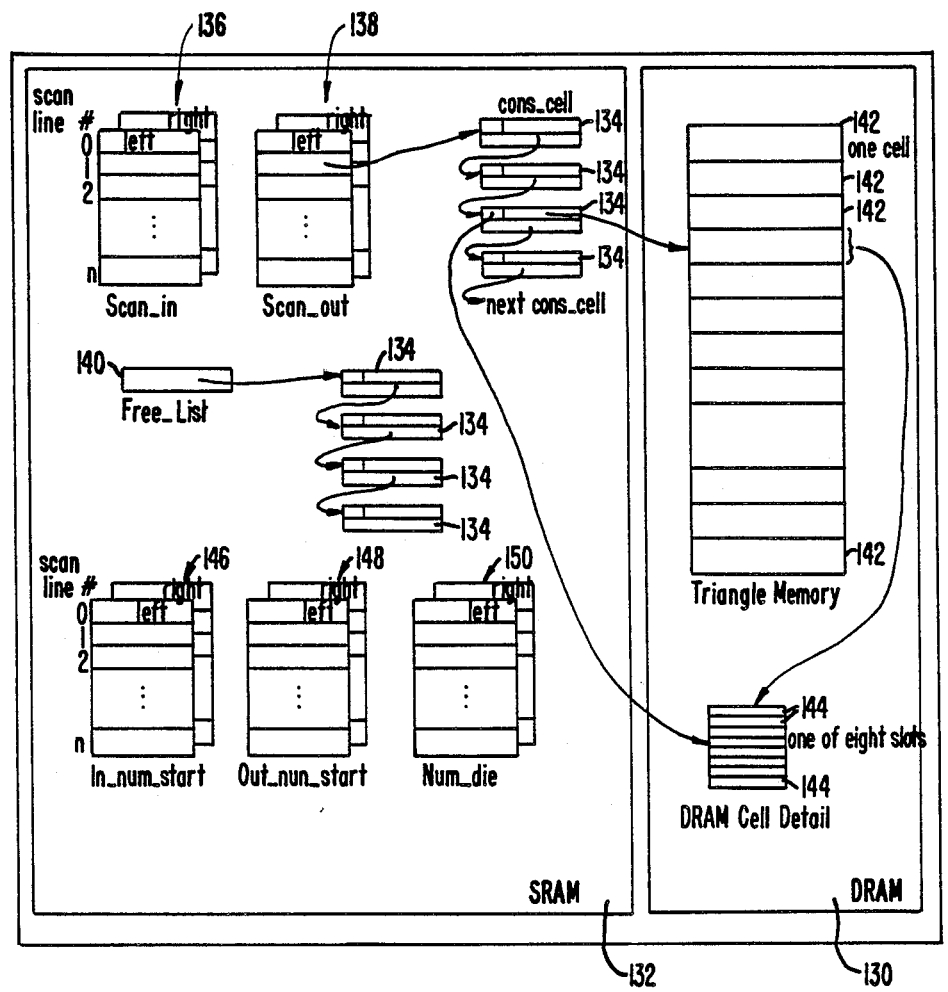
FIG._6.

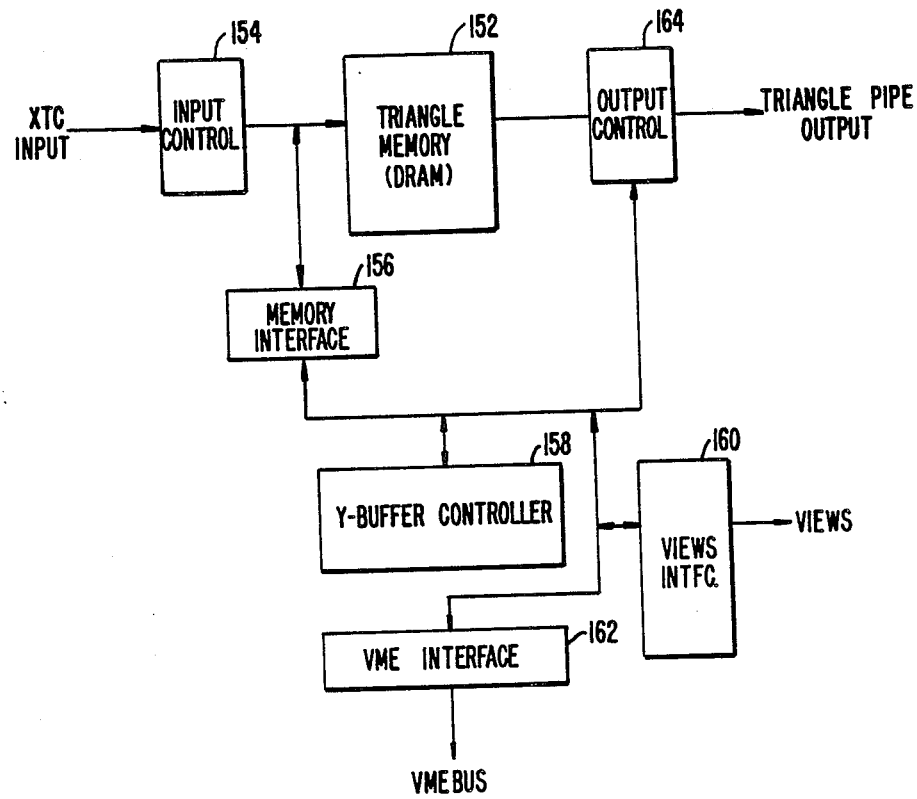
FIG._7.

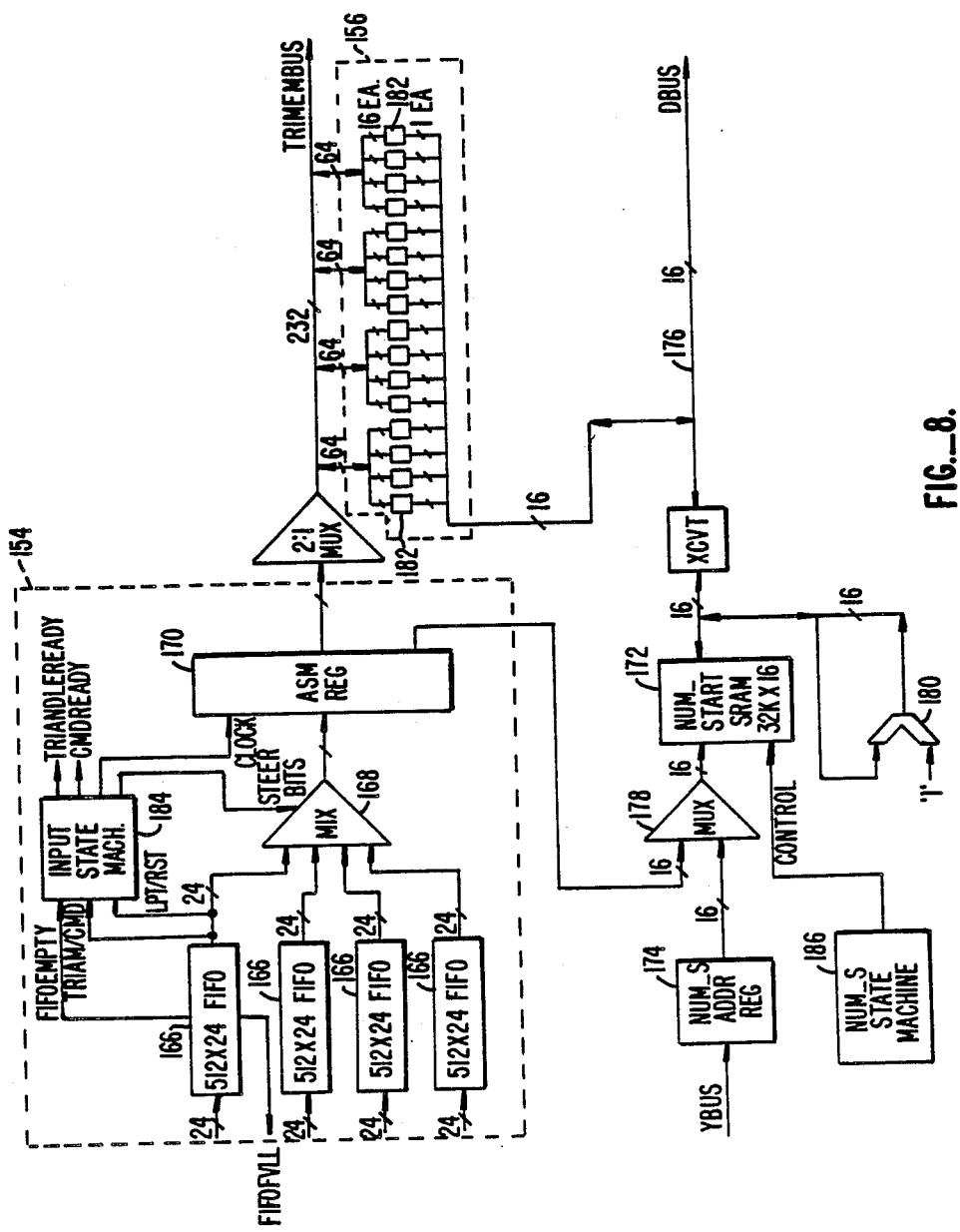
FIG._8.

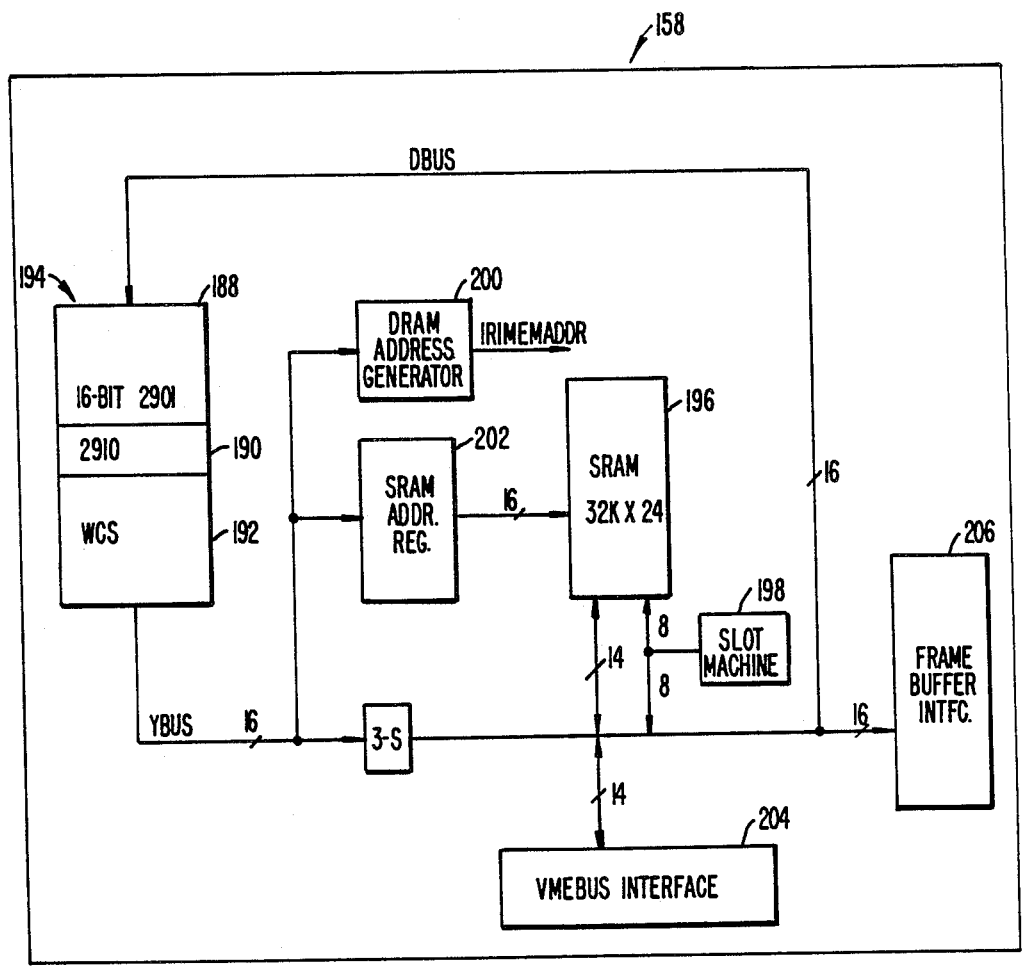
FIG._9.

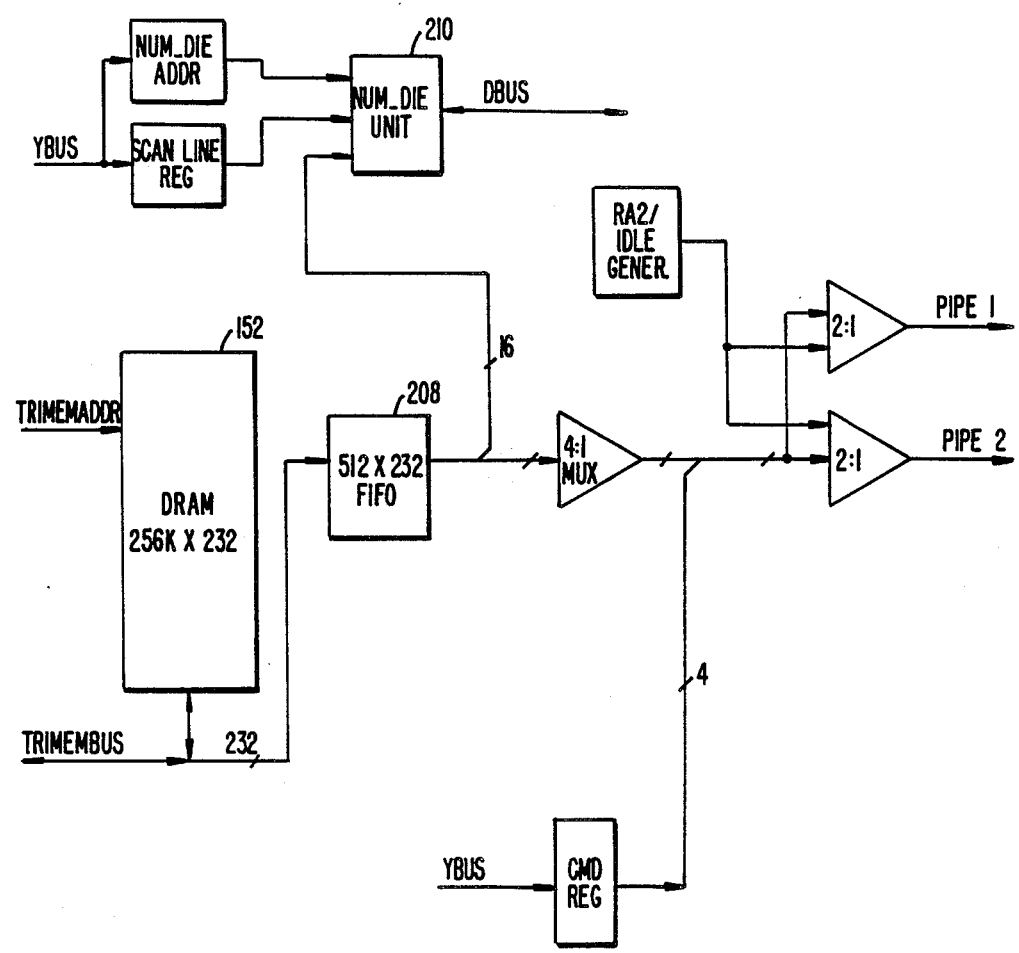
FIG._10.

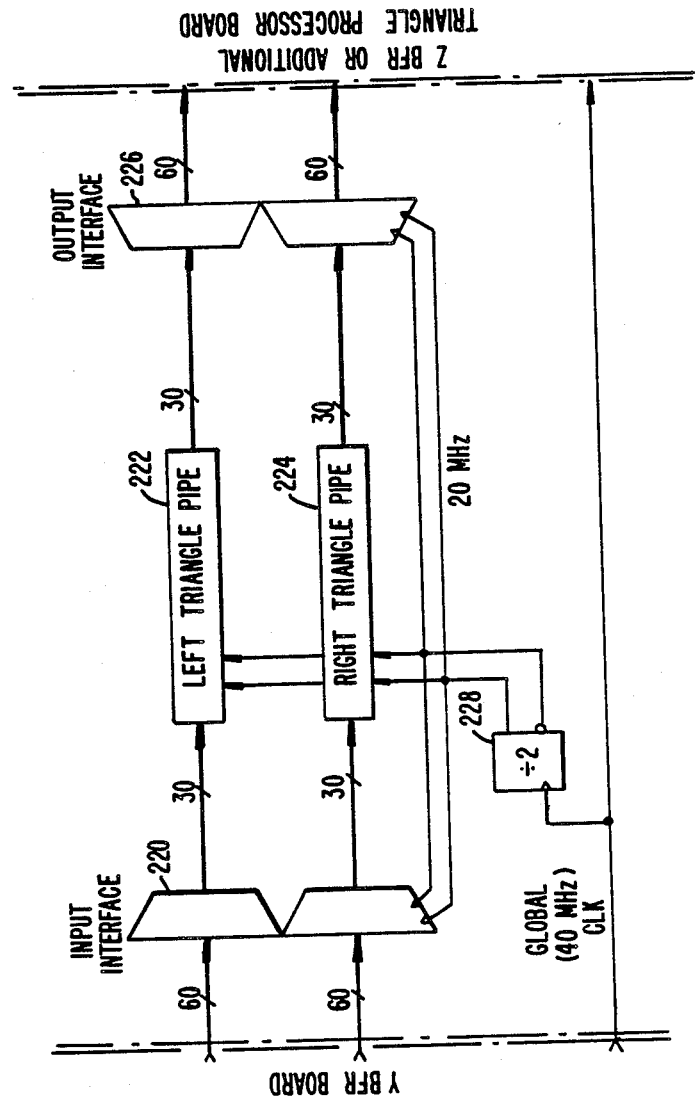
FIG._11.

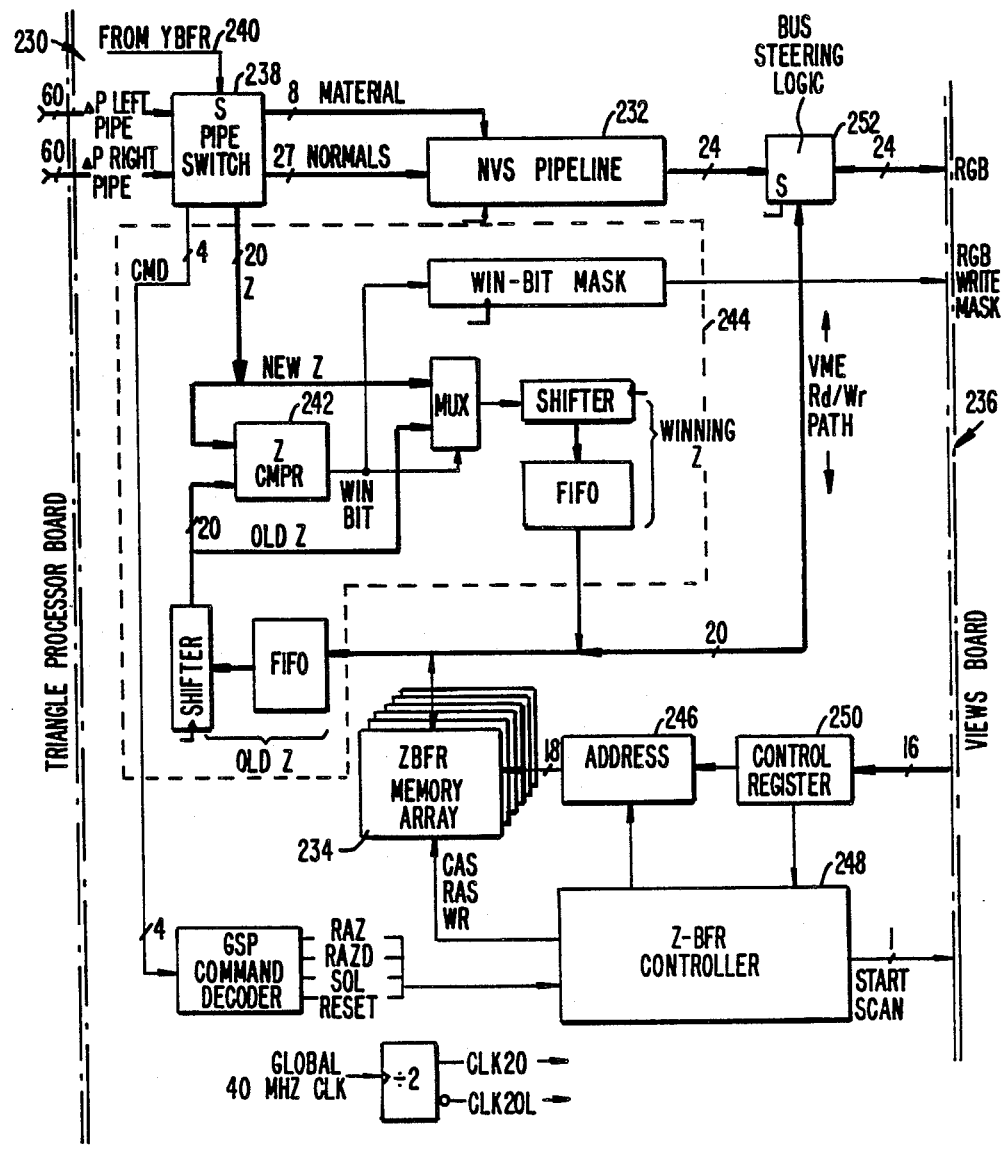
FIG._12.

3-D GRAPHICS DISPLAY SYSTEM USING TRIANGLE PROCESSOR PIPELINE

BACKGROUND

The present invention relates to processing systems for three-dimensional graphics displays Three-dimensional computer graphics displays are used to display images to a user as if he were observing a real world environment. These systems store in a data base a representation in three-dimensional coordinates of three-dimensional objects, as well as their color and other properties. Additional "environment" information including the number, color, location, and other properties of illumination sources, atmospheric properties, and many other details may also be specified. The display is produced after being provided with the desired viewing angle for the viewer. The system must calculate all the details of the image, including determining which objects obscure others from the viewer's point of view, and present them accordingly.

A typical graphics display system is shown in FIG. 1. An image data base 12 stores a description of the objects in the scene. The objects are described with a number of small polygons which cover the surface of the object in the same manner that a number of small tiles can cover a wall or other surface. Each polygon is described as a list of vertex coordinates (X, Y, Z in "Model" coordinates) and some specification of material surface properties (i.e., color, texture, shininess, etc.), as well as possibly the normal vectors to the surface at each vertex. For three-dimensional objects with complex curved surfaces, the polygons in general must be triangles or quadralaterals, and the latter can always be decomposed into pairs of triangles.

A transformation engine 14 transforms the object coordinates in response to the angle of viewing selected by a user from user input 16. In addition, the user may specify the field of view, the size of the image to be produced, and the back end of the viewing volume so as to include or eliminate background as desired.

Once this viewing area has been selected, a clipping circuit 18 eliminates the polygons (i.e., triangles) which are outside the viewing area and "clips" the polygons which are partly inside and partly outside the viewing area. These clipped polygons will correspond to the portion of the polygon inside the viewing area with new edge(s) corresponding to the edge(s) of the viewing area. The polygon vertices are then transmitted to the next stage in coordinates corresponding to the viewing screen (in X, Y coordinates) with an associated depth for each vertex (the Z coordinate). In a typical system, the lighting model 20 is next applied taking into account the light sources 22. The polygons with their color values are then transmitted to a rasterizer 24.

For each polygon, rasterizer 24 determines which pixel positions are covered by the polygon and attempts to write the associated color values and depth (Z value) into frame buffer 26. Rasterizer 24 compares the depth values (Z) for the polygon being processed with the depth value of a pixel which may already be written into the frame buffer. If the depth value of the new polygon pixel is smaller, indicating that it is in front of the polygon already written into the frame buffer, then its value will replace the value in the frame buffer because the new polygon will obscure the polygon previously processed and written into the frame buffer. This process is repeated until all of the polygons have been rasterized. At that point, video controller 28 displays the contents of frame buffer 26 on a display 30 a scan line at a time in raster order.

A number of systems have been designed to improve upon the basic system of FIG. 1. With recent improvements in floating point processing and polygon fill algorithms, the main bottleneck of the system is the amount of time required to rasterize each polygon, compare each pixel generated to the one already stored in the frame buffer, and then write the pixel into the frame buffer. The time required to repeat this process for each pixel of each polygon is substantial.

A basic method is characterized by a single rasterization processor writing pixels one by one into a DRAM frame buffer array. The improved systems are characterized by employing a large number of processors in parallel in which the individual processors represent pixels in the frame buffer. These systems differ in how the processors are assigned to pixels.

The pixel-planes method employs brute force, and assigns a processor for every pixel in the display screen, as set forth in Foulton, et al., Pixel-Planes: Building a VLSI-Based Graphics System, 1985 Chapel Hill Conference on Very large Scale Integration 35 (H. Fuchs ed, 1985). The edges of two dimensional polygon descriptions are sent one by one to the pixel processors. The processors determine which side of each edge they are on, and consider themselves inside a particular polygon only if they are on the correct side of all its edges. Having determined membership for a given polygon, the pixel processors next load depth and (interpolated) color information inside their pixel value register, so long as the depth information is less than that of any previously stored pixel value. When all polygons have been processed, the information stored at each pixel is supplied to the display in raster scan order. This system has the advantage in speed over the system in FIG. 1 in that the drawing time for any polygon (with a fixed number of sides) is constant, regardless of the number of pixels effected by the polygon (the area of the polygon). The disadvantage is that an extremely large number of processors is needed. For instance, a $1K \times 1K$ display would require in excess of one million processors. This disadvantage is only somewhat mitigated by placing multiple pixel processors on a single chip.

The Scan Line Access Memory (SLAM) still requires custom storage registers for each pixel in the display, but only contains enough pixel processors for a single scan line. It is set forth in Demetrescu, High Speed Image Rasterization Using Scan Line Access Memories, 1985 Chapel Hill Conference on Very Large Scale Integration 35 (H. Fuchs ed, 1985). The idea here is to use external rasterization hardware to break up each polygon into horizontal runs of pixels. Only the start and stop addresses of these runs are entered into the SLAM chips, the internal one dimensional array of pixel processors determines which pixels are covered by this run. The results are written into an on-chip memory array of pixel values, indexed by the y location of this particular run. When all the polygons have been processed, internal double buffering allows the information stored at each pixel to be supplied to the display in raster scan order. This system has the advantage that large polygons can be rasterized in time mostly only dependent upon their height, not their area. The smaller number of pixel processors reduces the number of chips needed compared to pixel planes. However, the system does have several disadvantages. Considerable external circuitry must break up polygons into pixel runs, and sequence this data to the SLAM chips. The line by line overhead required per polygon reduces the overall speed of the system. Finally, the requirement for on-chip RAM resources for all pixels effected by the local pixel processors still means that an exorbitant number of chips are needed to make a functioning 1K×1K system.

The super buffer also employs a single scan line of pixel processors, but does not require local memory for all the pixels effected by them to be on the same chip. It is set forth in Gharachorloo and Pottle, Super Buffer: A Systolic VLSI Graphics Engine for Real Time Raster Image Generation, 1985 Chapel Hill Conference on Very Large Scale Integration 35 (H. Fuchs ed, 1985). The previous two systems take input polygons one at a time, rasterizing each one completely before going on to the next. The super buffer requires all the polygons to be displayed to be presorted by the y scan line they first appear on. Each polygon is broken up into runs on a scan line basis, and the runs sent to the pipe of pixel processors. The trick is to send all the runs for all polygons for a given scan line before sending any runs for any further scan lines. This requires a buffer of partially rasterized polygons to be kept. This system has the advantage that the time to rasterize a given polygon is as in SLAM: dependent only on the height of the polygon, and not its area. It also has the advantage that the number of chips required by a system is considerably lower than in the other two systems. However, it has several disadvantages. It shares SLAM's requirement for an off-chip polygon run generator, and adds the requirement for juggling several active polygons at a time within this generator. A further requirement is an off chip memory subsystem to store and sort by starting y scan line all the polygons to be displayed.

SUMMARY OF THE INVENTION

The present invention is a graphic processing system for representing three-dimensional images on a monitor which uses a pipeline of triangle processors coupled in series. The three-dimensional image is converted into a group of two-dimensional triangles with depth and other properties associated with each triangle. These triangles are then sorted to put them in scan line order, with each triangle having its position determined by the first scan line on which it appears. Before each scan line is processed, the descriptions of the triangles beginning on that scan line are sent into a pipeline of triangle processors. Each triangle processor accepts one of the triangle descriptions and stores it for comparison to the pixels of those scan lines which are subsequently sent along the triangle processor pipeline. For each new scan line, triangles which are no longer covered are eliminated, freeing resources, allowing the loading of new triangles entered into the pipe. After each scan line is processed, the pixels can be sent directly to the CRT or can be stored in a frame buffer for later accessing.

Each triangle processor stores a representation of one of the triangles and then compares each pixel to that triangle representation. If the pixel is not within the triangle, it is ignored and passed onto the next triangle processor in the pipeline. If it is within the triangle, it is compared to depth (Z) information tagged to the pixel by a previous triangle processor. The color, material and depth information for the pixel in the triangle which is in front is tagged to the pixel and output, and the information for the other triangle is thrown away.

Such a triangle processor is disclosed in detail in a copending application entitled "Triangle Processor for 3-D Graphics Display System", Ser. No. 117,110, filed 11/04/87 and incorporated herein by reference (the "Triangle Processor Application"). The present invention thus does the exact reverse of the prior art by storing triangle descriptions in processors and sending the pixels past the stored triangle descriptions. The prior art uses a processor for each pixel and sends the triangle descriptions past the pixel processors An ordering circuit (Y-buffer) sorts the triangles in scan line (Y) in order and sends them down the triangle pipe without assigning them to a particular triangle processor. When a particular triangle processor completes the last scan line covered by its triangle, it then accepts the next triangle description sent down the pipeline which reaches it. If the triangle processor is still busy with an existing triangle, it simply passes the triangle description down the pipe.

By keeping track of the number of triangles sent down the pipe and when they will expire, the Y-buffer can determine whether the pipe will overflow, without any feedback from the triangle pipe. If an overflow is eminent for a particular scan line, the Y-buffer stops sending triangle descriptions down the pipe for this scan line and continues normal processing.

The results are placed into the RGB Z (frame) buffer. The Y-buffer then repeats the process for the frame, starting at the first scan line where an overflow occurred. The unprocessed triangles are sent down the pipeline and processed. The pixels provided at the output to the frame buffer are compared by the frame buffer controller to the pixel already stored in the frame buffer. The pixel in the frame buffer represents the triangle that won (was in front) on the first pass, while the other pixel represents the triangle that won on the second pass. The frame buffer controller reads out at least the Z position of the pixel from the frame buffer memory, compares its Z position to the new pixel, and writes the winner back into the frame buffer.

Under certain circumstances, the frame buffer and frame buffer controller could be eliminated, and the pixel stream generated by the triangle processor pipe sent directly to a CRT. However, the presence of a frame buffer allows the rasterization process and possible overflows to be decoupled from the task of generating continuous video to the CRT, and allows for an overall more flexible system. In particular, it allows objects of virtually unlimited complexity to be rasterized over a large amount of time when desired.

The triangle processor splits the computation of pixels into two phases: loading of new triangle data followed by the rasterization of a single scan line of pixels. The rasterization process always takes the same amount of time for every line of a given image, proportional to the width in pixels of the desired output image. The loading process takes an amount of time which varies from scan line to scan line, proportional to the number of triangles making their first appearance upon a particular scan line. Note, though, that once the description of a triangle has entered the triangle pipe, no further explicit handling of the triangle is necessary. The data will find a home in an available triangle processor where it will continue to produce pixels for as many scan lines as the triangle is high.

In one embodiment, a second triangle processor pipeline is coupled in parallel with the first triangle processor pipeline. The first pipeline corresponds to the left half of the display, while the second pipeline corresponds to the right half. While the first half of a display line is being processed in the first pipeline, the second pipeline is being loaded with triangle data for the second half of the scan line. When the second half of the scan line is being processed, the first pipeline is loaded with data for triangles in the first half of the second scan line. As can be readily seen, the screen can be divided up further with additional parallel triangle processor pipelines.

The present invention provides an enormous speed advantage over the prior art for rasterizing. This advantage stems from the complete elimination of paying for the pixel by pixel frame buffer write time on a per-triangle basis The rasterizing time is now only limited by a constant load time overhead per triangle, plus a rasterization time bounded only by the number of pixels in the desired image. Improvements in the prior art style designs are limited by the data bandwidth limitations of commercial dynamic RAM memory chips.

The output of the triangle processor pipeline is provided to a normal vector shading circuit for providing shading information to each pixel. The normal vector shader is described in detail in copending patent application entitled "Normal Vector Shading System for 3-D Graphics Display System", Serial No. 117162, filed 11/04/87 and incorporated herein by reference (the "NVS Application"). Basically, a pipeline of normal vector shader processors are provided and pixels are processed in "leap-frog" fashion. The first pixel is picked up by the first processor, which will take several cycles to process the pixel. Meanwhile the second pixel leap-frogs over the first processor to the second processor. The third pixel leap-frogs over the first two processors to the third processor, and so on. When the first processor completes the shading process, it passes the finished pixel along and is freed up for the next pixel in line.

In the preferred embodiment, the normal vector shader is embodied on a single integrated circuit. A plurality of serially connected chips are employed in the system with lighting model parameters being loaded into the pipeline. Then rasterized streams of surface normal pixels are subjected to the illumination model producing a stream of 24-bit RGB image pixels as an output. Each normal vector shader chip in the pipeline contains all the circuitry necessary to perform a complete shading calculation every 16 clock cycles. By placing 16 chips in series, a pipeline is formed which is capable of applying the lighting model continuously at 20 megaHertz. The resulting 16-chip subsystem forms a complete 5-light source Phong shading on each individual pixel of the scene at 20-megapixel-per-second data rates. This provides a substantial speed advantage over all previously existing implementations of sophisticated lighting models The normal vector shader system (NVS) receives data representing surface normal vectors NX, NY and NZ with associates depth Z in the image for that normal vector, together with information about the material properties at that point. Command information is also supplied to the NVS. In response, the system passes the command, material, and Z-depth information through unaltered, but supplies complete color information in a red-green-blue system with 8 bits representing the intensity of each of the three colors. Of course, other color systems and digital word lengths may be employed.

BRIEF DESCRIPTION OF THE DRAWINGS

FIG. 1 is a block diagram of a prior art three-dimensional display processing system;

FIG. 2 is a block diagram of a three-dimensional graphics display processing system according to the present invention;

FIG. 3 is a block diagram of the display list processor of FIG. 2;

FIG. 4 is a block diagram of the transformation and clipping logic of FIG. 2;

FIG. 5A-5D show four classes of triangles into which triangles are sorted by the present invention;

FIG. 6 is a diagram of the data structure used by the Y buffer of FIG. 2;

FIG. 7 is a block diagram of the Y buffer of FIG. 2;

FIG. 8 is a block diagram of the input controller and memory interface of the Y buffer of FIG. 7;

FIG. 9 is a block diagram of the Y buffer controller of FIG. 7;

FIG. 10 is a block diagram of the triangle memory and output controller of the Y buffer of FIG. 7;

FIG. 11 is a diagram showing two triangle pipes according to the present invention; and FIG. 12 is a block diagram of the normal vector shading and RGB Z frame buffer circuits of FIG. 2.

DETAILED DESCRIPTION OF THE PREFERRED EMBODIMENTS

FIG. 2 is a block diagram of a graphics display processing system according to the present invention. A host work station 42 is coupled to a display list DRAM 44 and a display list processor 46. Host work station 42 loads display lists into display list DRAM 44 and edits the display lists as desired. Display list processor 46 interprets the display list code and outputs primitives, structures and commands to transform and clip unit (XTC) 50. Optionally, a B-spline to polygon processor 48 may be inserted if the display list is defined in terms of splines rather than polygons. Transform and clip circuit 50 transforms the triangle descriptions from model space to view space, then clips the triangles so that only the portion of triangles in the view area or the guardband area are passed along.

Triangle preparation and Y-sort circuit 52, in conjunction with Y buffer 54, sorts the triangles into scan line order. Each triangle is assigned to the scan line upon which it first appears This circuitry keeps track of the number of triangles sent down the triangle pipeline as well as the number of triangle processors which are freed up in order to prevent an overflow condition. The triangle pipeline consists of a series of triangle processors 56 which are loaded with descriptions of particular triangles. The triangle processor then compares these descriptions to pixel positions as each scan line is traversed. The triangle processors output the proper value for each pixel to a normal vector shading circuit 58. This circuit provides the appropriate shading of the three-D picture in accordance with chosen angles of light, etc. The output of the normal vector shader is provided to an RGB Z buffer 60 and from there to a CRT 62. A frame buffer controller 63 compares the contents of frame buffer 60 to a new pixel value from a second pass through the triangle processor pipeline after an overflow. RGB Z frame buffer 60 and controller 63 may optionally be eliminated since the data is provided scan line by scan line ready for display. However, provision must then be made to handle overflows and assure that the load time for the triangles does not exceed the line flyback time of the CRT.

Display List Runner

The Display List Runner is a front-end processor sitting between host processor 42 and transformation processor (XTC) 50. It is a triple height VME bus circuit board (mechanically conformant to the Sun VME bus Board Standard). Host processor 42 includes SUN3 or SUN4 boards running UNIX, or could include higher performance UNIX processors such as the MIPS MD-29000 VME boards. VAX/VMS interface is possible through microVAX or 8600 ethernet connections or via high-speed Q-bus or BI-bus to VME-bus converters. The goal of the Display List Runner is to furnish a high-speed, compute-intensive environment for traversing the display list, optionally handling spline vectorization, handling matrix transformation and communicating with the host and graphics subsystem.

FIG. 3 is a block diagram of Display List Processor 46 and Display List Memory 44 of FIG. 2. Display List Memory 44 contains a list of op-codes and data for each graphics process. A Display List Processor 64 is responsible for loading the lists from host processor 42 over a VME bus 66. Host processor 42 edits the display lists, dynamically managing Display List Memory 44.

DLR 64 interprets the display list code, outputting primitives, structures and commands to the transform and clipping processor (XTC) 50. Outline checking is performed to trivially reject objects when appropriate. The goal of runner 64 is to supply 1.7 million triangles/second to XTC 50 when the system operates at peak speed.

DLR 64's functions include calculating matrix multiplies and maintaining matrix stacks for view transformations, vectorizing splines and triangulating general polygons. Pick data (describing triangles within a section selected by the host) is returned to DLR 44 by XTC 50 after the XTC transform and clip stages. Pick data returned from the XTC will be sorted (to z-buffer returned points) and sent to the host. One of the few drawbacks to the deep pipeline of the system of the present invention is that by the time a pixel is displayed, and thus can be "picked" by the user, the object context that produced that pixel is long gone. The picks have to be trapped much further up the pipe. This can be done by defining a very small window around the area where the user "picked", and re-rendering the entire object into this window to see what lands there. Because most geometry will be bypassed by the guardband volume and clipping tests (due to the small window), this technique is not as slow as it may seem.

DLR 64 will load registers, control store and perform diagnostics via VME bus 66. It must also handle communication with host 42 (downloading and uploading display list segments, receiving commands, interrupt handling) and with a frame buffer controller. Text embedded in the display lists will be transferred to the frame buffer via the VMEbus interface.

Display List Runner (DLR) 64 is a bit slice chip set consisting of a 32-bit integer processor, a floating point processor, and program sequencer. The chip set is tailored to high speed integer and floating point processing and supports a C compiler as well as a microcode assembler. A Writable Control Store (WCS) code memory 68 for the DLR code (256k- microcode words by 64 bits) is a high-speed DRAM with static column mode access. No parity checking is provided for code memory 68. A Scratch-Pad RAM 70 provides 32k by 32 bits of high speed SRAM, allowing zero-wait state operation for random processor accesses. Display List Memory 44 is 32 Mbytes with an option for a minimal configuration of 16 Mbytes. It consists of 1 Mbit DRAMs, packaged in SIP or ZIP modules, with an upgrade option to 4 Mbit DRAMs if they become available. Static column mode access is provided for high-speed sequential memory cycles.

VME Bus Interface 72 couples DLR 64 to VME bus 66. DLR 64 must have both master and slave capability on the VME bus 66. Host processor 42 handles arbitration and processes interrupts, although DLR 64 is responsible for handling certain interrupts. The slave interface is necessary so that host 42 can send data to DLR 64. Master capability allows DLR 64 to communicate with other boards coupled to VME bus 66. Direct memory access (DMA) capability allows DLR 64 to download display list segments from host 42 and upload segments should swapping become necessary.

XTC Interface 74 is two 32-bit private busses, to and from XTC 50. The path from DLR 64 to XTC 50 will be decoupled by a FIFO deep enough to feed data to XTC 50 while DLR 64 completes a bounding volume check. This interface operates at a peak loading rate of one 32-bit transfer every 80 ns.

Display list memory (DLM) 44 is dual-ported, accessible over VME-bus 66 and the internal processor bus. A host access will cause DLR 64 to be locked out of DLM 44. An internal VME lock-out mechanism is used to minimize the host access time to DLM 44.

The functional units of DLM 44 are extents, heap and support structures. Extents are segments of display list op-codes and data. Each extent is a fixed size, packed by the host, and starts with a header which points to the next extent and ends with an end extent. Execution of display list op-codes involves traversal of an extent and interpretation of the commands which may involve jumps and/or calls to other extents. When execution continues past an extent, DLR 64 must jump to the next extent pointed to by the current extent's header. If the next extent is not currently loaded into DLM, the DLR must inform the host and wait for the host to indicate where the missing extent is located. The DLR will then fetch this extent and load it into DLM, at a starting address specified by the host. (NOTE: The DLR is oblivious to DLM overflow; it just looks for executable extents.)

Extents are packed by the host and transferred to display list memory 44 via VME-bus 66. The host manages all the allocation of extents and is responsible for compaction and/or swapping if display list memory overflows.

The heap is a section of display list memory 44 that contains stored data. It may contain coordinate locations during dynamics, referenced by display list code. The host is responsible for maintaining the heap area using r/w access over VME-bus 66.

Support structures consist of trees and hash tables to aid in object and tag searches. This area is maintained by the host over the VME-bus.

The host has two data paths to the DLR. In a first mode, a communication channel exists between the DLR and the host processor on the VME bus. This channel may be viewed by the host as a "device", enabling the UNIX device driver to interface. The command set is simple; a typical command being:

Execute Display List—

Given starting extent location, the DLR will begin display list traversal.

The DLR executes extents in sequential order of received commands, and provides an n-level buffer for storing pending commands. When the DLR needs to execute an extent which has been swapped out, it informs the host via a VME bus vectored interrupt. A command/status register will be mapped onto the VME-bus.

A second mode allows the UNIX host to treat DLM as extended physical memory. A data path maps DLM directly onto the VME-bus, allowing the host random access of any location in DLM. Conversely the DLR can become bus master and transfer chunks of host memory into DLM. Both types of transfers can be performed in single long-word mode or block transfer long-word mode. (NOTE: ALL VME transfers must be long-worded aligned.) The VME bus address is jumper selectable. In UNIX systems it is configured to an address space between the stack (which grows down from the maximum virtual address) and the code/data space (which grows up from address 0).

I/O handling (during dynamics) is handled by updating values in the DLM heap.

A special download path is provided for the host access to the DLR code memory over the VME bus. Upon initialization, the host process performs diagnostics on the DLR, and loads the control store SRAM.

All geometry passed from DLR 64 to XTC 50 over XTC interface 74 has been broken down into chains of triangles or vectors. The display list data is in Euclidean space, built out of chains consisting of a string of points, each point consisting of 4 long words: x, y, z, and the normal/command word. Normals can be stored in the display list in "packed" form; each normal is 9 bits. The remaining 5 bits are used to encode a command to the XTC. Eight longwords are required per point when the normals are unpacked.

Direct communication with frame buffer controller 63 is provided via the VME-bus link. (An indirect path is provided by inserting pass-through commands into the triangle pipe.) The DLR uses this link to transfer character data, and perhaps 2-D graphics data, as well as patterns for BITBLT. (Fonts are downloaded from the host.)

FIG. 4 is a block diagram of the transform and clipping circuitry of block 50 of FIG. 2.

Input stage 98 controls inputs from DLR 46. Transform stage 100 gathers points and normals and transforms them to a homogeneous clip space. View clip logic 102 tests points against view planes, clips and outputs points. Screen transform circuit 104 performs perspective divide and translation into screen space. Pick stack 106 maintains a stack of <obj id, tag>. Pick stack 106 also returns stack and surviving points (in screen space) and controls outputs to DLR 46 for diagnostics. Model clip logic 108 tests points against 6 half-spaces, sectioning support logic, and also provides pick support. Truncation circuit 110 provides an IEEE representation of truncated Px & Py. Delta calc circuit 112 calculates dx, dy, dz, dnx, dny, dnz, and 1/dy from the current point to the previous 2 points. Triangle assembly circuit 114 calculates dx/dy, sorts triangle data, classifies triangles, and outputs data as right, left and new. Triangle assembly circuit 114 also outputs point data as required. Pre-setup circuit 118 handles detail calculations required by the setup stage (i.e., distance to nearest scan line). Setup circuit 120 calculates the triangle packet and sends the triangle data to the output stage. Output circuit 122 performs Float to Fix operations, interfaces to FIFOs on Y-buffer 54.

A three bus structure for the circuit of FIG. 4 is used. The input and output takes place over private, read or write only busses 124, 126. A third write only bus 128 to Display List Runner (DLR) 64 is provided for diagnostics read back and pick support.

For most stages in XTC 50, the code to control that stage is hard coded as part of the design.

Each stage is able to handle three types of input: (1) the input required for that stage to handle triangle/vector data at full tilt; (2) data required internal to that stage (i.e., matrices for the transformation stage); and (3) data to be passed on to the subsequent stages, which may be data for that next stage, or data to be passed off board.

Each stage in the pipe is stoppable. If a subsequent stage is busy, each stage is able to pause, holding its data intact, until the pipe becomes open again. If a previous stage is not ready, i.e., no data out, then each stage will "unwind", outputting its data and returning to an idle state to wait for more data in.

Input stages 98 controls private, read only 32 bit bus 124 from DLR 64. Data is read in, tested for type, and flagged before being inserted into the pipe at transform stage 100. This stage controls a mode/material register that is used to set the material value for an object being rendered, to flag input data for pick mode, vector mode, or triangle mode, and to control backface rejection. This mode/material information is inserted into the pipe along with the input data, allowing mode changes without having to flush the pipe. Input stage 98 also controls the Control Store download for all stages in the XTC.

Input stage 98 requires no floating point units, and consists of combinational logic to test for data types, a parallel to serial shifter for control store download, along with logic to control the download, and mode/material registers.

Transformation stage 100 transforms points to homogeneous canonical clip space (CCS), and transforms normals to work coordinate space (modeling transform only). If the normals in are packed, this stage will unpack the normals.

Transformation stage 100 reads in triangle/vector data in the following forms: (1) Triangle data (strips or stars) with packed, 9 bit normal components; (2) Triangle data (strips or stars) with predefined 24 bit RGB values; (3) Triangle data (strips or stars) with unpacked normals; and (4) Vector data with Euclidean coordinates.

The type of triangle data (packed or unpacked normals) being sent to XTC 50 is defined for transformation stage 100 via the mode/material data passed along with coordinates from the input stage.

Support of these multiple types of data is provided for future compatability with real-time patch triangulation. It is worth noting that the packed normal, Euclidean coordinate approach requires only 4 transfers over the 32 bit bus, at an average rate of 125 ns. (worst case) per transfer. With unpacked normals, the amount of data required doubles, to a minimum of eight 32 bit transfers.

Perspective and screen transformation circuit 104 performs the perspective division and puts the input data into Euclidean screen space. The points input to this stage are homogeneous. The points output are in window coordinates. Each window is defined as being in the first quadrant, i.e., both x and y are greater than or equal to zero. Triangle data in and out of this stage will be strips or stars.

Since perspective involves division, the BIT B2110 is used in conjunction with a WTL3332 at this stage. Otherwise this section of the pipe needs only a simple controller and some assorted combinational logic.

Modeling clip, sectioning and pick support section 108 implements a clip against up to six arbitrary planes for the purpose of providing "cutaway" views of an object. A good example is a cross-sectional view of the earth's crust. In addition, since most data during a pick operation will be clipped away at the view clip stage, this stage also supports pick operations. This stage controls pick stack 106 and 32 bit write only bus 128 to DLR 64.

The modeling clip tests against the six modeling planes if enabled, and accepts, rejects or tags for clipping on the basis of the result of the test and the clip operation performed, i.e., OR, AND of the results. If only one or two modeling clip planes are defined, then a defining plane used by the modeling clip for solid seeming cutaway views may be passed down from the DLR. This defining plane is used to decide to which section plane a backfacing triangle belongs. Modeling clip with more than two planes will be a "shell" clip, i.e., no attempt is made to make the interiors of solids appear solid.

The modeling clip logic also supports displaying cutaway sections with some translucent pattern.

Data into modeling clip stage 108 will be strips or stars, and clipped triangles will be handled as described for the view clip stage, providing strip/star data out. Stage 108 does not output a point every 12 cycles, when modeling clip/sectioning is enabled. Rather, stage 108 is more general purpose in nature, and causes as much as a 100% slowdown when the modeling clip or sectioning is enabled.

The pick function of stage 106 maintains an <object id, tag> stack and is able to push values on the stack, pop values, replace the top of stack, and initialize the stack. When the XTC is in pick mode, as determined by the mode/material value accompanying the data from perspective stage 104, the data will be subjected to the pick logic instead of the subsequent triangle setup calculation stages. Whenever any geometry remains "alive" to this stage, the Euclidean screen coordinates of the surviving triangle/vector will be returned to the DLR with the contents of the stack. The DLR will then be responsible for doing a depth sort on surviving objects to determine which was visible to the user.

Stage 108 is also used to provide diagnostic support. It is placed in the pipe at the mid-point and so can be used to verify to integrity of the data path to this point.

Stage 108 consists of a 2900 architecture machine with a WTL3332 and a BIT B2110 FMPY. In addition it has 2k by 96 microcode and a 4k by 32 local static RAM.

Delta calculations stage 112 reads in points and begins the calculations for triangle packets output for the triangle processor pipe. The values calculated are dx, dy, dz, dNx, dNy, and dNz from the current point to either the previous two points if a strip, and from this point to the previous point and the start point if a star. In addition, truncation stage 110 will "truncate" the x and y values of input points. A truncated value is the floating point representation of the next lower integer (round towards 0).

The data into stage 112 is still in strip/star format. The data out of this stage will be the two sets of delta values (dx, dy, dz, dNx, dNy, and dNz), the integer values of x and y in floating point format, comparison results to integer ex, ey to the integer x, y of the previous two points, and the input strip/star data. It is at this point that the data paths begin to get significantly wider.

The hardware in stage 112 is a WTL3332, sequencing logic, the truncation logic, and the comparison logic. The truncation logic consists of four 8-bit latches, three 512×8 registered PROMs, and four 20R8A PALs. The compare logic employs eight 20R8A PALs.

Triangle classification and assembly stage 114 classifies triangles and lines and outputs data that will reorganize the points for the following stages. In order to do this, this stage needs to calculate certain of the parameters required in subsequent stages. This data will be transferred to help save calculations down-pipe.

The classification logic classifies triangles as being wide top, wide bottom, new right, new left, degenerate in y, or backfacing. It is here that backface rejection occurs, when enabled.

At this point strip/star input is finally broken to individual triangles. The output from this stage will be required point/normal data, and the derivatives with respect to y for each line. In addition this stage will calculate 1/(leftdx/dy−rightdx/dy) for subsequent stages. The data calculated and output from this stage will be determined by the classification of the triangle. Point data output is organized with p0 at the upper left, and p1 and p2 to the clockwise of p0. Edge data, dx/dy etc., is organized as left edge, right edge, and new edge (if applicable).

Stage 112 is actually two stages sharing one BIT 2110 FMPY for the divisions. Divisions are calculated at 3 cycles per operation. This arrangement keeps the FMPY fully occupied.

Stage 112 consists of a BIT 2110 FMPY for generating 1/dy and 1/(leftdx/dy− rightdx/dy) and two WTL3332s to do the inverse slope calculation. The results of certain of these calculations are gathered and the address to a lookup table (PROM based) is generated by combinational logic implemented in a collection of PLDs. There is also some significant steering logic to control the final data calculations and output from this stage.

Pre-setup stage 118 performs additional calculations required prior to the final setup stage, for example, the distance to the next intersected scan line in y.

The data into this stage is the points, p0, p1 and p2; and the derivatives to the lines with respect to y for the left, right and new edges. Note that the various classes of triangles require different information and calculations, so the triangle classification will be used to address the microcode, creating in effect a case statement.

Stage 118 uses a WTL3332, with steering and sequencing logic.

Setup parameters stage 120 calculates the setup parameters for each triangle/vector. At this point the data is split into four "streams", called streamA, streamB, streamC, and streamD. Because certain calculations are required to perform other calculations, this stage is really four loosely connected processes. StreamA flows to the output stage, as well as into streamB, streamC, and streamD. streamB flows only to the output stage. StreamC flows into streamD and the output stage. StreamD flows only to the output. Each stream uses short FIFOs to decouple itself from the previous stages. (Set-up stage 120 will perform pre-pipe calculations for sophisticated modeling (such as computations to render point and cone light source shading)).

StreamA contains the starting scan line (Y_MAX), the ending scan line (Y_MIN), CT_FIN, RIGHT_X, XINC_Z, XINC_NX, XINC_NY, and XINC_ NZ (as described in the copending Triangle Processor application. The most significant bit of the first word, Y_MAX, is used as a command flag. When set, this bit will indicate non-triangle/vector data to the Y-buffer. StreamA uses a WTL3332 and sequencing logic.

StreamB contains YINC_NX, YINC_NY, YINC_NZ, the required XINC_ values. However, the LEFT_ values require the YINC_** values, so this stage will be two tightly coupled processes. StreamB requires two WTL3332s operating in a pipelined fashion, with sequencing logic for control.

StreamC contains a copy of CT_FIN, along with the config values, YINC_Z, CT_2, LEFT2_X, and YINC2_X. StreamC uses a WTL3332, a holding register for the CONFIG value, and sequencing logic.

StreamD outputs the left/right flag in the most significant bit of the first word. The remainder of the first word is the material value. In addition to this, streamD contains YINC_LX, YINC_RX, LEFT_X, and LEFT_Z. This stage uses a WTL3332, a holding register, and sequencing logic.

Output stage 122 is the interface to the four 24 bit FIFOs on the Y-buffer. This stage reads in each of the four streams, and performs a float to fix calculation on numeric values. Non-numeric values, i.e., CONFIG, MAT, are passed through as are the flag bits for the first words of streamA and streamD.

The output stage is actually four independent processes running in parallel. The hardware for each stage is essentially identical, with some differences in the control logic to account for the non-numeric data.

The float to fix calculations are performed with barrel shifters, possibly a 32 bit device available from Logic Devices Incorporated. In support of the shifters is control logic for the FIFO interface, and sequencing logic for the data flow through the normalizing logic.

Clock generation and reset circuit 116 generates its clock signals for XTC 50. This is in order to allow future speed upgrades by replacing a crystal. The clock logic consists of a 25 MHz crystal, a dividing flip-flop and driver logic. This provides both a 40 nanosecond clock, and two 80 nanosecond clocks.

Reset to the XTC comes from two sources, a power-up reset from the backplane, and a software reset command decoded by the input stage. In order to ease microcode load operations, there is also an enable command to tell the XTC to allow the sequencers to operate following a reset.

Y-Buffer

The function of Y-Buffer 54 of FIG. 2 is to take the data output from XTC 50, in the form of triangle packets, and present it to the triangle processor pipe of triangle processors 56 at the appropriate times.

The XTC takes its input from the Display List Controller, assembles successive points into triangles and transforms and clips the triangles from world co-ordinates to screen co-ordinates. The resulting triangles are then classified, and parameters such as partial derivatives of the normals and Z (depth), both along the edges and the X axis, are calculated. This information, along with numbers indicating the scan lines at which the triangle first becomes active and at which the triangle ends, is assembled into a triangle packet and output to the Y-Buffer.

The Triangle Processor Pipe contains a large number of Triangle Processors 56, connected in a pipeline fashion. Data and commands are transferred along the pipe from one processor to the next. When a RESET command is issued, the processors reset themselves to allow them to be loaded with triangles that become active during the first scan line. After all such triangles are loaded, a SOL (start of line) command is issued and then a RAZ command is repeated for as many pixels in the X direction as necessary. For each RAZ command, each triangle processor compares an incremented X position on that scan line to its triangle. Following this, an EOL (end of line) command is issued, as a result of which all processors step to the next scan line and become (those that do not have active triangles) ready to be loaded with triangles starting in the second scan line. This process repeats itself until the whole window is scanned. In the process, processors whose triangles end, or die, become free and can be reloaded with new triangles.

The function of the Y-Buffer is to accept triangle packets from XTC 50 and sort them on a scan line order. When all triangles in a frame have been processed by the XTC and sorted, the Y-Buffer 54 then steps the triangle processor pipe through the above sequence. While this off-loading of the Y-Buffer takes place, a new frame is already being processed by the XTC, so the Y-Buffer must handle the sorting and the off-loading in parallel.

Additional functions of the Y-Buffer are to synchronize operations with Frame Buffer Controller 63. These include starting or stopping the off-loading process, and passing and receiving special commands.

The Y-Buffer accepts new triangle packets from the XTC as fast as they become available. A new packet is received every 12 XTC clock cycles. With a 50 nS target clock cycle, this represents one triangle every 600 nS. This is a minimum requirement.

The Y-Buffer must be able to store as many triangles as possible, within reasonable limits. Since the goal of the system is to provide real time, 20 frames/second update rate, with a speed of around one million triangles/second, it follows that a frame will contain about 50 thousand triangles. Since parallel input and output operations are required, the Y-Buffer has enough memory for at least two such frames, or at least 100 thousand triangles.

The Y-Buffer handles two types of exceptions: (1) Triangle Pipe Overflow, when not enough free triangle processors are available to load all the triangles that become active in a particular scan line; and (2) Y-Buffer Overflow, when a frame contains more triangles than the storage available. This conditions might, and very likely will, happen together, when rendering complex images.

The Y-Buffer also handles special commands, such as "pass through" commands, coming from the XTC, that have to be sent to the NVS or other subsystems downstream keeping some sequential frame based order. When scanning a frame, the Y-Buffer also takes into account the "guard band" created by the XTC around the viewing cube. This requires the stepping of the initial scan lines, without actually scanning them, and the scanning of extra pixels at the beginning of every line.

A bin sorting algorithm is used to perform the scan line sorting. The idea is to provide different bins for every scan line in the window; when a new triangle arrives, it is placed in a bin according to its starting scan line number. On the output phase, all triangles in the bin for the first scan line are read before going on to the next scan line and bin, and so on.

FIG. 6 graphically depicts the data structures. The main memory array, comprising about 8 Mbytes of dynamic RAM is shown as DRAM 130. It is divided into cells 142, with every cell holding eight slots 144 for triangle data. A separate memory, shown as SRAM 132, contains lists of pointers to access the DRAM memory. For every cell in DRAM, there is one cons cell 134 in SRAM associated with it. A cons cell is a structure containing:

dram ptr—An address pointing to a unique cell in DRAM. Since there is a fixed, one to one relationship between every cons cell and every DRAM cell, this pointer can become a virtual pointer, that is, it is part of the data structures, but in the actual hardware the address of the cons cell is used as the dram ptr, without actually having to store the value.

slot ptr—A pointer to one of the eight slots in a DRAM cell. A new triangle will be written to this slot, and then slot ptr will be incremented.

next ptr—A pointer to another cons cell

Two arrays, scan in array 136 and scan out array 138 are used by the input and output processes respectively. Each contains one entry per scan line, with every entry being a pointer to a cons cell. One additional pointer, free list pointer 140, points to a list of cons cells which are available, i.e., pointing to empty DRAM cells.

Upon reset, scan in array 136 is initalized with every entry pointing to a different cons cell 134. Each one of these cons cells has its next ptr initialized to NULL, and its slot ptr initialized to zero, i.e., pointing to the first slot in the DRAM cell. All other cons cells are linked together and are pointed to by free list 140.

Three additional arrays, in num start array 146, out num start array 148, and num die array 150, also have one entry per scan line, and are used to keep track of how many triangles start and die in a particular scan line. They are all initialized to zero on reset.

When a triangle comes in from the XTC, the starting scan line number is used to index scan in array 136 and obtain a pointer to a cons cell 134. The dram ptr and slot ptr in that cons cell are then used to address the DRAM array 130 and store the triangle. The slot ptr is then incremented. If this was the last slot available in the cell, the free list pointer 140 is used to allocate another cons cell, which is linked to the list for the current scan line. At the same time, the in num start array 146 entry is incremented. In the event that the free list is empty, a Y-Buffer overflow occurs, either at this point or when the next triangle for that scan line arrives.

After all triangles for the frame have been input, the output process can begin. First scan in 136 becomes scan out 138 and vice versa, so that a new frame can be input while the current one is being output. Likewise, since the information in num start 146 is used in the input and output processes, two such lists are provided, and they are also swapped. The output process is the inverse of the input process. Scan line by scan line, the pointer to the first cons cell 134 is obtained from scan out array 138. As the triangles in the DRAM cells are off-loaded, the respective cons cells are added to the free list to be reused. During the off-loading, num die array 150 is incremented according to the scan line in which the triangle ends. In the event that not enough free Triangle Processors are available for all triangles that have to be loaded in a scan line, a Triangle Pipe overflow occurs. The off-loading of triangles for that scan line is suspended, and the packets that did not made it are kept in scan out array 138. Scanning continues, but after the whole window is scanned, a new pass through scan out array 138 is necessary.

Two Triangle Processor Pipes can be implemented in parallel, each assigned to either the left or right half of a window. To support this, a few variations are introduced in the scheme above. These are, mainly, keeping two sets of scan in and scan out, and two sets of xx num start and num die. All triangle packets coming from the XTC are tagged as belonging to either the left or right side of the window.

A block diagram of the Y-Buffer is shown in FIG. 7. Shown in the center of the diagram is the Triangle Memory, or DRAM 152. This is the main storage for triangle packets. An Input Controller 154 receives data from XTC 50 and reassembles the data into a structure that matches the required load map for the Triangle Processors. A Memory Interface 156 allows a Y-Buffer Controller 158 to access the main memory as well. This is the main controller in the board. It is responsible for all recordkeeping, all lists and other data structures, and overall control of the whole subsystem. An interface 160 allows it to communicate directly with the frame buffer controller 63, and a slave VME interface 162 gives the host computer access to most of the Y-Buffer functions. Finally, an Output Controller 164 retrieves triangle packets from memory 152 and feeds them to the triangle pipe.

FIG. 8 shows a block diagram of Y-Buffer Input Controller 154 of FIG. 7. As the XTC computes the triangle parameters, the values are written into four 24-bit wide FIFOs 166. They consist of the 22 parameters defined in the Triangle Processor load map, and the starting and ending scan lines. Two extra bits are added to indicate whether the triangle belongs to the left or right half of the window, and to indicate whether the packet is indeed a triangle packet or a pass through command. The FIFOs 166 will be implemented using IDT 7201-type devices. The parameters are pushed into the FIFOs 166 by the XTC in the order in which they are calculated, and not all FIFOs contain the same number of parameters. A mixing stage 168 is used to read all necessary words in a packet, and steer the bits to the correct location in an assembly register 170. Although FIFOs 166 are 24-bit wide, not all parameters are 24-bit. The total number of bits in the load map is 448, to which two 16-bit values, start and end scan line, are added, for a total of 480 bits. Once a packet is assembled, the Y-Buffer Controller 158 is flagged, and it will generate the address into triangle memory 152 and start the memory cycle. The 464-bit word (from the 480 input bits, the 16 bits containing the starting scan line are used during the input process and are not stored) is multiplexed into two 232-bit words for storing it in memory. A state machine 184 controls mixer 168 and register 170.

By using FIFOs 166 as the interface, a mechanism for handling Y-Buffer overflow condition is inherent to the design. When the overflow occurs, the Y-Buffer will start off-loading triangles out of the scan in array 136 and will take in new triangle packets into the same scan in as soon as cons cells 134 become available as a result of the scanning. In the meanwhile, packets will pile up in the FIFO 166 until it is filled up, at which point the XTC stages will begin stalling as the FIFO full condition propagates upstream through the pipe. This handling of overflow allows for the efficient rendering of complex images, since the input and output process proceed concurrently, with the triangle memory dynamically being allocated on an as needed basis.

The bottom of FIG. 8 shows circuitry for implementing the in num start and out num start arrays 146, 148 in hardware. Shown is a static RAM 172, which can be accessed by the Y-Buffer Controller 158 by setting up an address into an address register 174 and accessing data through its DBUS 176. When a new triangle is input, a multiplexer 178 selects the starting scan line as the address to memory 172 and an adder 180 increments the memory location at that address. A state machine 186 controls SRAM 172. This unit holds four num start arrays, for the left and right halves of the window for both the input and output process. The RAM size will be $32K \times 16$, thus allowing for every array to contain up to 8K scan lines. There is also a limit of up to 64K triangles for each individual scan line, from the fact that the word size is 16 bits. Two conditions are detected by this unit: (1) if the starting scan line number is greater than 8K, an error condition is reported and (2) if the number of triangles on one scan line is 64K or more, an overflow condition occurs, which is handled the same as the memory overflow condition.

Also shown in FIG. 8 is the Memory Interface 156 of FIG. 7. This interface should enable the Y-Buffer Controller to access any location in DRAM 152. The 232-bit word is sliced into 16-bit words, and registered transceivers 182 are used to be able to read a whole wide word and feed it to the controller 16 bits at a time, or have the controller assemble a wide word 16 bits at a time and write it to memory in one memory cycle.

Y-Buffer Controller 158 is the unit in charge of all of the bookkeeping. A block diagram is shown in FIG. 9. The controller is built around a 16-bit 2901-type bit-slice processor 188 with a cycle of around 75 nS (13.5 Mhz),depending on the memory speeds available. (Several manufacturers now produce very fast 16-bit 2901-type bit-slices, including AMD, IDT, WaferScale Integration, Cypress and others.) A 2910 sequencer 190 and a limited amount of control store 142 completes a processor 194. 224 Kbytes of fast static RAM 196 is available as local memory to the processor. This RAM is where most of the data structures discussed will reside. Local SRAM 196 is divided into three sections:

A $32K \times 24$ block is allocated to hold up to 16K cons cells and scan in and scan out arrays for up to almost 4K scan lines, the "almost" being necessary because of scratch memory requirements. The 24-bit word will represent either a cons cell, a scan in or scan out memory, or a scratch memory location. In the last two cases, only the 16 bits directly accessible to the processor are significant. In the case of the cons cell, the 24-bits are divided into a 16-bit field containing the next ptr and a 8-bit field containing the slot ptr. The dram ptr is implicit in the cons cell address. This memory block is easily expandable if a larger triangle memory or longer arrays are required. Eight of the 24 bits are not directly accessible by the processor and hold the pointer to one of the slots within the DRAM cell. These bits (initially only three of them) are handled by a slot machine 198, which increments it and signals the controller for cell overflow condition. A diagnostics datapath is provided to set or read these bits at any time.

A $32K \times 16$ block is accessible to the controller and to specialized hardware to hold the num start arrays. This memory size will hold up to four arrays each with 8K entries. This block is shown in FIG. 8.

A second $32K \times 16$ block is similar to the above, but for the num die array. Since only two of these are needed, this memory size will accommodate up to 16K scan lines. This block is shown in FIG. 10.

All of the RAM blocks are addressed using external address registers. These registers are normally loaded by the controller, before accessing the memory. A DRAM address generator unit 200 is shown. This unit is initialized by the controller, and contains sequential logic to generate successive addresses to the triangle memory, as well as all control signals required. Dynamic refresh is also provided by this unit. SRAM address generator 202 is provided for SRAM 196.

Also shown in FIG. 9 is a VME interface 204. This is a slave only interface. It provides VME mapping for access to the writable control store and some status, control, command and data registers.

A frame buffer interface 206 is shown in FIG. 9. It is implemented as two back to back 16/32-bit registers, so data and commands can be sent to and from the frame buffer boards.

FIG. 10 shows Triangle Memory 152 of FIG. 9 together with the circuitry of Output Controller 164. The Triangle memory consists of 256K words 232 bits wide, or slightly more than 7 Mbytes. Two consecutive words in memory contain the data for one triangle packet. The first word contains the first four words to be loaded into the Triangle Pipe, plus the least significant eight bits of the ending scan line. The second word contains the last four words for the Triangle Pipe, plus the eight most significant bits of the ending scan line. The memory is implemented with 58 $256K \times 4$ static column DRAM chips.

With addresses provided by DRAM address generator 200 in FIG. 9, a whole DRAM cell is read out using static column mode. The data read is buffered into a 232-bit wide FIFO 208, so that it can be fed to the Triangle Pipe at the right speed. This very wide FIFO should be deep enough to contain a whole DRAM cell being loaded, 16 words, plus some of the data of the previous cell. Although 32 words will be enough, IDT 7201-type FIFOs, which are much deeper, may also be used.

After the data comes out in the other end of FIFO 208, the ending scan line information is extracted. Circuitry similar to num start memory 172 in FIG. 10 will be provided to update the num die array. Access to this num die unit 210 is available to the controller, for diagnostics and SOL processing purposes. There are two conditions here that require some attention: (1) the case where the ending scan line is greater than the maximum addressing range allowed, which is clearly a fatal error and would signify incorrect or corrupt input data, (2) the case where more than 64K triangles die in one scan_line, which can only happen if the triangle processor pipe contains at least 64K triangle processors. Since it would not be possible for the Y-Buffer controller to recover from either of the two conditions, no special circuitry will be provided to detect them.

The data without the ending scan line bits is read from the FIFOs in 224-bit words at 5 Mhz. It is them multiplexed into 56-bit words at 20 Mhz by multiplexer, with each word containing one word of the load map minus the command bits. These bits are appended by the Command Register, and will usually be the bits for the NEW command.

The 60-bit word is finally sent through a crossbar switch to one of the two Triangle Pipes. The second Triangle Pipe is fed either RAZ or IDLE command by a RAZ/IDLE generator.

The algorithms implemented in the Y-Buffer will now be discussed.

The initialization task is only done at reset time. Every cons cell is automatically initialized to point to one unique DRAM cell by virtue of the value being encoded in the address. A free list is created which initially contains all of the cons cells. The cons cell at location 0 is never allocated, and a pointer to it represents the null pointer. Once the free list is created, the scan ins are allocated one cons cell per scan line. Finally, the in num start arrays are initialized to zero.

Once the data structures are initialized, the controller goes into a ready mode, in which it is waiting for either a command from the VME bus, or a packet from the XTC, containing either a triangle or a command. Triangles are classified as belonging to the left or right side of the screen. When a triangle is ready in the input FIFOs, a state machine 184 will load the parameters into the assembly register, and flag the controller to execute its input process. The updating of the in num start array is done by a dedicated state machine 186. The incoming packet contains parameters indicating its starting and ending scan line.

When a full frame has been stored in the triangle memory, or when a Y-Buffer overflow occurs, the input process is started to get the triangle packets into the triangle processor pipe and free up the cons cells. Before the output process begins, the input and output arrays and lists are swapped, so that scan out now contains the pointers to the triangle packets that have just been input.

With the Triangle Pipe being actually two pipes in parallel feeding a single normal vector shader (NVS) Pipe, the timing of the loading and scanning must be extra careful. Since the NVS interpolates normals across the width of the window, it cannot accept IDLE commands between RAZ commands once the scanning of the line begins. To prevent such things from happening, the Y-Buffer Controller must follow certain steps with any new scan line.

1. Determine how many triangles are to be loaded into every pipe, using the num start and num die arrays.

2. Compare the time to load the triangles into the second pipe with the time to scan half a window.

3. Load the triangles for the first pipe.

4. If, from (2), the time to scan is longer than the time to load, start scanning the first pipe and loading the second pipe. When the load to the second pipe is done, insert IDLEs into it until the scanning of the first pipe ends, then start scanning the second pipe.

5. If, from (2), the time to scan is shorter than the time to load, start loading the second pipe, and insert IDLEs into the first pipe until the remaining time to load is the same as the scan time. Then start scanning the first pipe. The scanning of the first pipe will end at the same time the loading ends, so start scanning the second pipe immediately.

Due to the finite size of the triangle memory, it is likely that during the rendering of a frame of certain complexity a condition will occur where no more DRAM cells are available to store future triangle packets. The Y-Buffer detects this condition and provides a graceful mechanism to overcome it. Similarly, with a given number of triangle processors in the triangle processor pipe, more triangles might be active in a line than there are processors to process them. These conditions are called Y-Buffer Overflow and Triangle Pipe Overflow respectively.

A Y-Buffer Overflow might happen as a result of two conditions, both dealing with the resources available to store the packets for a given frame:

(1) No cons cells are available in the free list, and thus no more DRAM cells are available.

(2) A numeric overflow occurs in the in num start arrays, and thus no more triangles can be stored that start in a particular line.

The technique presented here for handling the first type of overflow has two characteristics:

(1) It is pre-emptive, that is, it detects when the last resource has been utilized and processes the overflow at that point, rather than when no resource is available for a newly arrived triangle. The ramification of this is that an overflow occurs if, for example, there are no more cons cells in the free list, even though certain scanlines might have empty slots in cells that had already been allocated.

(2) It supports dynamic cell allocation, which allows the input process to utilize cells when they become available.

In normal, non-overflow conditions, the XTC outputs packets which are stored through scan in until the whole display list is traversed. At that point an end-of-frame command tells the Y-Buffer controller to activate its output process and to provide a fresh scan in for a new frame to be processed by the input process.

When an overflow occurs, there might or there might not be an active output process. In case there is, and if the overflow occurs because no more cells where available, the input process will wait for the output process to free up cells, and use them as they become available, with the input FIFOs and XTC stalling at intervals. If there is no active output, or if the output finishes and the overflow condition persists, then an output process will be activated, but the input process will not be given a fresh scan in but rather share the same array with the output. New triangles could then be input at the same time the output process is emptying cells. To preserve data integrity, a software mechanism will lock input of triangles to the current scan line. Additionally, if triangles are input to lines already scanned, a "soft pipe overflow" is generated, since another pass of the output process is necessary.

The second type of overflow is handled differently. It must be borne in mind, though, that because of the numbers involved, it is likely that only a few scan lines will overflow without having an overflow from the first type and thus preventing further input without off-loading of some of those overflowing scan lines. For this reason, when an overflow of the second kind occurs, the in num start will be allowed to wrap around, but a list of overflowing lines will be stored in the scratchpad memory of the Y-Buffer controller, while the input continues. On SOL processing, the list, which is likely to contain a few items, will be searched for a match with the current scan, and taken care of properly. Note that no change is needed to the output process since it does not utilize the in num start array.

Whenever not enough processors are available in the triangle processor pipe to process all the active triangles in a given scan line, a Triangle Pipe Overflow occurs. This was shown in the output process as the boolean variable another pass, which causes the process to iterate over and over until all the triangles have been output, before it can terminate. Although no special processing is needed, subsequent passes through scan out should cause the SOL processing to detect scan lines without any active triangles, i.e., for which the total available processors equals the total number of processors, and to issue successive SOLs without actually having to scan the line. This will greatly improve performance, since it will tend to "dampen" the steps that occur when a pipe overflow occurs because of a small number of unprocessed triangles.

The output process will not output triangles from a cell if there are not enough available processors for all of the triangles in a cell. Although this might seem foolish at first, the cost of doing so is not that great. First, given about one thousand processors in the pipe and eight triangles per cell, underutilizing one to seven processors will represent less than one percent of waste. Second, it makes it easier for the output controller, since to output only a subset will require the output to go in the opposite direction as the input (like in a stack). Since every triangle is stored in two memory locations, it will require the address generation to decrement the address by two between triangles, and then increment it by one for the next word for the present triangle. If it proves that there is no great cost for doing this, the final design might support output of partial cells. This will hardly add any performance, but will only make the design more elegant.

The pipeline of triangle processors 56 of FIG. 2, normal vector shader 58 and RGB Z-buffer 60 are referred to as a Rendering Engine. The function of the Rendering Engine is to receive triangle packets from the Y-buffer, then to render and light-model these triangles. The resulting RGB pixel data is passed on to the frame buffer controller board for storage in a canvas buffer. The Rendering Engine consists of two printed circuit boards (PCBs).

Two triangle processor pipes can be placed in parallel, with one processing a left half of a display screen and the other processing a right half of a display screen. Such a triangle processor board is shown in FIG. 11. It consists of: An interface 220 to the Y-buffer; two triangle pipes 222, 224 of as many triangle processor chips as will fit on the board (about 100); and an interface 226 to the NVS/Z-buffer board.

The triangle chips are logically organized as two parallel pipelines 222, 224. This organization allows one pipe to be rendering an image while the other pipe is being loaded with new triangle packets from the Y-buffer.

The second PCB in the Rendering Engine is the NVS/Z-buffer board shown in FIG. 12. It consists of:
An interface 230 to the Triangle Processor PCB;
an NVS pipeline 232;
a Z-buffer 234 with its support logic; and
an interface 236 to the frame buffer PCB (not shown).

The Rendering Engine will accept, from the Y-buffer, up to 2 million "new" triangle packets per second. The output will be RGB and Z values for each pixel. The RGB data will be written to a canvas buffer in the frame buffer and the Z value written to the Z-buffer. During rasterizing one pixel will be output for each 50 nS clock cycle (20 million per second). In a traditional graphics system the output of the Rendering Engine is sent to a frame buffer for display. In one alternate approach, the single frame buffer is split into two types of buffers, the scan buffer and canvas buffers. The scan buffer is a bit map of the data displayed (scanned) on the CRT. (If two, or more, windows overlap then only the visible parts are stored in the scan buffer.) Each window has its entire image rendered (drawn) into a canvas buffer.

The scan buffer is built by copying parts of various canvas buffers so that the displayed image appears as overlapping windows. One of the advantages of this configuration is that the transformation processor and Rendering Engine do not need to handle the complexities of a windowing system.

A central theme of the architecture of the present invention is the allocation of a processor per active triangle on the current scan line. In the rasterizing mode the triangle processor processes all X values in the scan line. If the triangle "covers" the current X location a set of normal vectors and a Z value are computed. The computed Z is compared to the old Z value passed in to the processor from the triangle processor ahead of it in the pipe. If the new Z is in front of the old Z then the computed normals and Z values are sent to the next processor in the pipe. If the old Z is in front then the old set of normals and Z values are passed to the next processor. In the case where the triangle does not cover the X location the processor is quiescent and passes the old data through to the next processor.

In order for the triangle processor to rasterize a triangle it needs to be loaded with a packet of data that describes the triangle. The packet is computed by the XTC and sent to the Y-buffer. The Y-buffer then controls the loading of the packets on the Y scan line where they become active. Since loading a packet requires some amount of time (8 clock cycles per packet) the pipe is split into two parts. This allows one side to be loaded while the other side is rasterizing. The triangle processor PCB of FIG. 11 is designed to support the two pipe concept.

Input interface section 220 receives two separate command/data streams from the Y-buffer, one for the left pipe, and one for the right pipe. Interface 220 will latch this incoming command/data in as 20 MHz TTL levels (60 signals per pipe) and provide output to the triangle chips as 40 MHz multiplexed CMOS levels (30 signals per pipe).

The triangle pipe section is arranged as two parallel pipelines 222, 224 of triangle processor chips, both of which function independently of each other. Command/data input steering to the two pipes is provided by the Y-buffer which has complete and independent control over both pipes inputs. The pipe output steering (merging of data from two pipes into a single stream) is also handled externally by the Y-buffer, and the actual combining of the data streams takes place externally on the NVS/Z-buffer PCB. As a result of implementing these switching functions off the triangle processor PCB, the option of adding extra triangle boards to the system has been provided. This option may be desirable as a performance upgrade for applications with complex images that overflow the triangle pipe.

Output interface section 226 connects directly to the CMOS command/data outputs from the end of the triangle processor pipeline. Interface 226 accepts these inputs as 40 MHz multiplexed signals (30 signals per pipe) and converts them to buffered 20 MHz demultiplexed signals (60 signals per pipe). These buffered outputs will drive either the NVS/Z-buffer PCB or an optional additional triangle processor PCB.

A clock generation section 228 generates a two-phase symmetrical 20 MHz output. This clock will be derived from a global 40 MHz source clock in a manner which guarantees the required phase relationship for interfacing with other system boards. The triangle processor PCB will use this clock to synchronize all data transfers through the pipeline and at the input and output interfaces.

The NVS/Z-buffer board of FIG. 12 consists of two main parts: the NVS pipeline 232 and the Z-buffer 234. The data input to the NVS/Z-buffer board will be in two streams (one per triangle pipe). The input interface section 230 contains a pipe switch 238 so that the input to the NVS pipe and the Z-buffer will appear as a single stream of data. The pipe switching will be controlled by the Y-buffer board on a control line 240. The Y-buffer will also send control information to indicate if data entering the NVS/Z-buffer is first pass or overflow pass data.

On the first pass the NVS will produce a light modeled RGB pixel for all pixel locations in the image. The resulting RGB output of the NVS pipe will then be written to a canvas buffer in the frame buffer board. Also during the first pass all Z-buffer memory locations associates with the current frame will be loaded with the Z-depth values.

On overflow passes only selected canvas pixel and Z-buffer locations will be updated as follows. On all Z values coming from the triangle pipe a compare will be made in a comparator circuit 242 with the corresponding Z value stored on the previous pass. If the Z "wins" then the associated RGB output of the NVS pipe will be written into the frame buffer and the winning Z value will be written back to the Z-buffer. If the old Z "wins" then no frame buffer or Z-buffer update will occur. The actual process of performing these "selective" RGB pixel updates is controlled by a write mask which results from the Z compare operation.

The NVS consists of a pipeline 232 of about 16 NVS chips. The pipeline performs phong shading of images based on surface normal vectors from the triangle pipeline and produces an RGB data stream for storage in a frame buffer. The shading includes the effects of five infinite light sources.

In the 4670 class of terminals the Z-buffer must be read and compared for all 3-D objects drawn to the screen. In the graphics system of the present invention, the triangle processor includes logic to do the Z compare on a pixel-by-pixel basis. If there were enough triangle processors to guarantee that a triangle pipe overflow would never occur we could actually omit the Z-buffer 234. (In the case where an application needed to save the Z values we could switch a frame buffer to store Z values instead of the usual RGB). The problem is that we have no way to predict the number of triangle processor chips required to preclude overflows, therefore a traditional Z-buffer has been specified to handle these cases.

The resolution of the screen will be 1536×1152, or about 1.8 million pixels. The Z-buffer is fixed in size and can store up to about 2 million Z points. The fixed size has at least two effects. The first is that if we support a refinement routine then the oversampled image will need to be broken into patches that are no larger than the size of the Z-buffer. The second effect is that when an image is scanned it claims some of the Z-buffer. Incremental additions to a displayed image may be difficult in a windowed environment without rescanning the entire image. This is because another window may have been scanned and so overwritten part of the Z-buffer that the first image was using. There are at least two ways around this problem. They are to allow the software to split the Z-buffer into several parts so that the total Z points stored in all buffers do not exceed 2 million. The other way is to allow the Z-buffer to be written and read from a VME bus device, through the frame buffer interface.

As stated above the Z-buffer has two major modes of operation: first pass and overflow pass modes. It also supports two other secondary modes: VME bus read and VME bus write modes. The Z-buffer logic is divided into five sections: the Z-buffer memory array 234, compare logic 244, address generation logic 246, control logic 248 and associated registers 250, and steering logic 252.

The Z-buffer memory array 234 is built using one mega-bit static column DRAM parts in the 256K×4 configuration. The memory will be organized as 256K bytes by 20 bits deep. This implementation will allow the storage of 2 million Z words. Notice that the memory is not forced to map to any particular screen layout and should be viewed as a large linear array.

In first pass mode the entire image will be scanned. The triangle processor pipe will output, for each pixel in the image, either a RAZD op-code and a Z value, or a RAZ op-code with Z assumed to be at Z equal to infinity. During this pass the control register will have the "first pass" bit set, forcing all Z values to be written into the Z-buffer and all RGB data for each pixel (from the NVS pipe) to be written to a frame buffer. On overflow passes the Z values stored in the Z-buffer will be read and compared to the Z values being output by the triangle pipe. If the new Z "wins" the new Z value will be loaded into the winning Z FIFO so that it will overwrite the old Z value. A bit in the RGB write mask will also be set so that the new RGB data can overwrite the old data in the canvas buffer. If the old Z "wins" the old Z will be loaded into the winning Z FIFO so it can be rewritten back to the Z-buffer memory array. A bit in the RGB write mask will NOT be set. This will leave the old data in the frame buffer.

For VME transfers of the Z-buffer the input/output data lines of the Z-buffer are enabled on the NVS RGB output bus which allows transfer to/from the frame buffer PCB through the frame buffer chip. Once the Z values are on the frame buffer board they can be transferred across the VME bus using the existing frame buffer VME bus interface.

Address generation logic 246 is a set of counters that are loaded by the frame buffer board. They can be set to point to any location in the Z-buffer. A Z-buffer state machine will then control the read and write cycles to the memory. It is important to note that all ending and starting addresses into the Z-buffer are byte aligned. This does NOT mean that windows must be byte aligned but only that the allocation of Z-buffer memory be byte aligned.

The Z-buffer control logic 248 keeps track of the mode that the system is in and forces the address generation logic to issue the correct synchronized Z-buffer address and to control the datapath steering. It also uses the following set of registers 250:

A control register includes VME bus steering information, first pass bit, overflow pass bit.

A Z-buffer start address register is loaded with the starting address of the current window's Z-buffer. The frame buffer will maintain a list of addresses for each active Z window and load the appropriate value at the start of each frame. It will be up to the windowing system to limit the total Z-buffers in use, to less than 2 million pixels.

An X width register is used by the Z-buffer controller to calculate the beginning address of the next line, including when no scanning occurs on the current scan line. Note that in overflow passes the Y buffer may omit scanning a series of lines by sending back-to-back SOL commands.

All registers are written from the frame buffer. Note that on power up all registers will be cleared.

Z-buffer steering logic 252 is used to allow VME bus access to the Z-buffer memory array. In first pass and overflow modes RGB data from the NVS pipeline is sent to the frame buffer, to be stored in a canvas buffer. In VME transfer mode the steering logic enables the Z-buffer data lines on the RGB data output bus and Z values are routed to the frame buffer.

On first pass the Z-buffer compare logic 244 is not used. That is all Z values are written into the Z-buffer and a win bit mask 254 is forced to all ones, so that the RGB data from the NVS pipe will be written into a canvas buffer in the frame buffer. During overflow passes the Z-buffer compare logic is enabled so that the contents of the Z-buffer is compared to the Z data being output by the triangle processor pipe. The winning Z is always written to the Z-buffer. In the case where the new Z wins the new value will be stored in the Z-buffer. If the old Z wins the Z-buffer rewrites the old Z back into the memory array. The win bit is also used to build the write mask so that the frame buffer will update only new RGB values.

The Z-buffer may be accessed by a VME bus device. The special access requires that the frame buffer receive a VME bus request to read or write the Z-buffer. The frame buffer will then wait until there is no image being scanned before accessing the Z-buffer. (This is because the same bus that sends the RGB data to the frame buffer is used to access the Z-buffer.) This mode is supplied to allow diagnostic visibility into the Z-buffer, and give an application access to the Z-buffer if it should be required.

As will be understood by those familiar with the art, the present invention may be embodied in other specific forms without departing from the spirit or essential characteristics thereof. For example, other polygon shapes than triangles could be processed or more than two parallel triangle pipelines could be used. Accordingly, the disclosure of the preferred embodiment of the invention is intended to be illustrative, but not limiting of the scope of the invention which is set forth in the following claims.

What is claimed is:

1. A graphics processing system, capable of being coupled to a monitor, for representing three-dimensional images on the monitor, comprising:
   means for converting a representation of three-dimensional objects into a group of two-dimensional polygons;
   means for ordering said polygons by scan lines on said monitor on which said polygons will first appear;
   a pipeline of polygon processors coupled in series to receive said polygons from said means for ordering at a first end of said series, each of said polygon processors including
      means for storing a representation of a single, separate one of said polygons,
      means for comparing said representation of one of said polygons to a pixel to determine whether said pixel is within said polygon,
      means for comparing any Z position tagged to said pixel to the Z position of said polygon, at the x-y location of said polygon corresponding to the x-y location of said pixel, if said pixel is within said polygon, and
      means for tagging to said pixel a material property and Z position of said pixel in said polygon to a next polygon processor in said series if said polygon has a Z position in front of said Z position tagged to said pixel; and
   means coupled to a second end of said series, for displaying said pixels on said monitor.

2. The system of claim 1 wherein said polygons are triangles.

3. The system of claim 1 wherein
   said means for ordering includes means for transmitting data representing each polygon which first appears on a scan line to said polygon processor pipeline prior to a processing of said scan line by said polygon processor pipeline and
   each polygon processor includes means for accepting a new representation of a polygon and discarding an old representation of a polygon after a last scan line covered by said old polygon is processed.

4. The system of claim 3 further comprising means for counting a number of available polygon processors without a stored representation of a polygon and for producing a count which represents the number of new polygon representations which can be loaded into said pipeline.

5. The system of claim 4 further comprising:
   means for halting a flow of polygon representations to said polygon processor pipeline when said number of available processors reaches a predetermined minimum number;
   means for storing overflow polygon representations prior to said polygon processor pipeline;
   frame buffer means for storing a first group of pixel representations from said polygon pipeline;
   means for providing said overflow polygon representations to said polygon pipeline in a second frame pass; and
   means for comparing Z positions of pixel representations stored in said frame buffer to pixel representations from said second frame pass through said polygon pipeline.

6. The system of claim 4 wherein said means for counting comprises:
   a counter;
   means for incrementing said counter by a number of new polygon representations transmitted to said series of polygon processors;
   means for storing a number of polygons expiring on each scan line; and
   means for decrementing said counter by said number of polygons expiring on each scan line.

7. The system of claim 1 further comprising:

a second series of polgon processors coupled in parallel with said first mentioned series of polygon processors; and means for loading one of said series of polygon processors with said representations of polygons while the other one of said series of polygon processors is processing pixels.

8. The system of claim 7 wherein said means for loading loads representations for polygons beginning in a first portion of said monitor in said first series of polygon processors and loads representations for polygons beginning in a second portion of said monitor into said second series of polygon processors.

9. The system of claim 1 wherein said means for converting includes means for clipping ones of said two-dimensional polygons extending from inside to outside a predetermined viewing space defined by a plurality of clipping planes, said clipping means comprising:

means for comparing each of said polygons to said clipping planes to determine whether each said polygon intersects one of said clipping planes, is totally inside said viewing space, or is totally outside said viewing space; and means for transmitting polygons totally inside said viewing space without clipping to said means for ordering and discarding polygons totally outside said viewing space without clipping.

10. The system of claim 9 wherein said clipping means further comprises:

means for determining a guardband space, defined by a plurality of guardband planes, at least partially enclosing said viewing space such that a distance between each of said guardband planes and one of said viewing planes is greater than a predetermined estimated average polygon's maximum dimension;

means for comparing ones of said polygons intersecting one of said clipping planes to said guardband planes;

means for transmitting without clipping to said means for ordering ones of said polygons totally inside said guardband space.

11. The system of claim 9 wherein said clipping means further comprises:

means for determining which of said clipping planes are intersected by said polygons; and means for clipping ones of said polygons intersecting only one clipping plane with only said one clipping plane.

12. The system of claim 1 further comprising means for classifying triangles from an input of the coordinates of the vertices of a triangle, said means for classifying comprising:

calculation logic means for calculating a plurality of parameters of said triangle from said input of said coordinates; and look-up table means, coupled to an output of said calculation logic means for determining a triangle classification for every combination of said parameters, said look-up table means storing said triangle classification with addresses corresponding to combinations of said parameters.

13. A graphics processing system for representing three-dimensional images on a monitor, comprising:

means for converting a representation of three-dimensional objects into a group of two-dimensional polygons;

means for ordering said polygons by scan lines on said monitor on which said polygons will first appear;

a pipeline of polygon processors coupled in series to receive said polygons from said means for ordering at a first end of said series, each of said polygon processors including means for storing a representation of one of said polygons, means for comparing said representation of one of said polygons to a pixel to determine whether said pixel is within said polygon, means for comparing any Z position tagged to said pixel to the Z position of said polygon, at the x-y location of said polygon corresponding to the x-y location of said pixel, if said pixel is within said polygon, and means for tagging to said pixel a material property and Z position of said pixel in said polygon to a next polygon processor in said series if said polygon has a Z position in front of said Z position tagged to said pixel;

said means for ordering including means for transmitting data representing each polygon which first appears on a scan line to said polygon processor pipeline prior to a processing of said scan line by said polygon processor pipeline, each polygon processor including means for accepting a new representation of a polygon and discarding an old representation of a polygon after a last scan line covered by said old polygon is processed;

means for counting a number of available polygon processor without a stored representation of a polygon and for producing a count which represents the number of new polygon representations which can be loaded into said pipeline;

means for halting a flow of polygon representations to said polygon processor pipeline when said number of available processors reaches a predetermined minimum number;

means for storing overflow polygon representations prior to said polygon processor pipeline;

frame buffer means for storing a first group of pixel representations from said polygon pipeline;

means for providing said overflow polygon representations to said polygon pipeline in a second frame pass;

means for comparing Z positions of pixel representations stored in said frame buffer to pixel representations from said second frame pass through said polygon pipeline; and means coupled to a second end of said pipeline, for displaying said pixels on said monitor.

14. A graphics processing system for representing three-dimensional images on a monitor, comprising:

means for converting a representation of three-dimensional objects in to a group of two-dimensional polygons;

means for ordering said polygons by scan lines on said monitor on which said polygons will first appear;

a pipeline of polygon processors coupled in series to receive said polygons from said means for ordering at a first end of said series, each of said polygon processors including means for storing a representation of one of said polygons, means for comprising said representation of one of said polygons to a pixel to determine whether said pixel is within said polygon, means for comparing any Z position tagged to said pixel to the Z position of said polygon, at the x-y location of said polygon corresponding to the x-y location of said pixel, if said pixel is within said polygon, and means for tagging to said pixel a material property and Z position of said pixel in said polygon to a next polygon processor in said series if said polygon has a Z position in front of said Z position tagged to said pixel;

said means for ordering including means for transmitting data representing each polygon which first appears on a scan line to said polygon processor pipeline prior to a processing of said scan line by said polygon processor pipeline, each polygon processor including means for accepting a new representation of a polygon and discarding an old representation of a polygon after a last scan line covered by said old polygon is processed;

means for counting a number of available polygon processors without a stored representation of a polygon, said means for counting including a counter, means for incrementing said counter by a number of new polygon representations transmitted to said pipeline of polygon processors;

means for storing a number of polygons expiring on each scan line;

means for decrementing said counter by said number of polygons expiring on each scan line; and means coupled to a second end of said pipeline, for displaying said pixels on said monitor.

* * * * *